United States Patent
Nonaka et al.

(10) Patent No.: US 7,657,111 B2
(45) Date of Patent: Feb. 2, 2010

(54) APPARATUS AND PROGRAM FOR IMAGE PROCESSING FOR OBTAINING PROCESSED COMPRESSED MOVING IMAGE DATA

(75) Inventors: Shunichiro Nonaka, Asaka (JP); Naoki Ikeya, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 1200 days.

(21) Appl. No.: 10/774,590

(22) Filed: Feb. 10, 2004

(65) Prior Publication Data

US 2004/0160645 A1 Aug. 19, 2004

(30) Foreign Application Priority Data

Feb. 14, 2003 (JP) ............... 2003-036091
Feb. 14, 2003 (JP) ............... 2003-036092

(51) Int. Cl.
*G06K 9/64* (2006.01)
*H04N 7/12* (2006.01)

(52) U.S. Cl. .................. 382/254; 375/240.25
(58) Field of Classification Search .......... 382/254
See application file for complete search history.

(56) References Cited

U.S. PATENT DOCUMENTS

| | | | | |
|---|---|---|---|---|
| 5,991,503 | A * | 11/1999 | Miyasaka et al. | 386/111 |
| 6,181,743 | B1 * | 1/2001 | Bailleul | 375/240 |
| 6,317,462 | B1 | 11/2001 | Boyce | |
| 6,373,992 | B1 * | 4/2002 | Nagao | 382/266 |
| 6,415,055 | B1 * | 7/2002 | Kato | 382/236 |
| 6,594,311 | B1 * | 7/2003 | Pearlstein | 375/240.01 |
| 7,042,524 | B2 | 5/2006 | Onagawa | |
| 2001/0033737 | A1 * | 10/2001 | Honjo | 386/52 |
| 2002/0059643 | A1 * | 5/2002 | Kitamura et al. | 725/136 |
| 2002/0067768 | A1 * | 6/2002 | Hurst | 375/240.03 |
| 2002/0114397 | A1 * | 8/2002 | Todo et al. | 375/240.29 |
| 2002/0136310 | A1 * | 9/2002 | Saunders et al. | 375/240.25 |
| 2002/0181595 | A1 * | 12/2002 | Obata et al. | 375/240.25 |
| 2002/0186769 | A1 * | 12/2002 | O'Brien | 375/240.12 |

FOREIGN PATENT DOCUMENTS

| | | |
|---|---|---|
| JP | 2000-134619 | 5/2000 |
| JP | 3087409 | 7/2000 |
| JP | 2001-177831 | 6/2001 |
| JP | 2002-135774 | 5/2002 |
| JP | 2002-142122 | 5/2002 |
| JP | 2002-142132 | 5/2002 |
| WO | WO 02/05564 A1 | 1/2002 |

* cited by examiner

*Primary Examiner*—Bhavesh M Mehta
*Assistant Examiner*—David P Rashid
(74) *Attorney, Agent, or Firm*—McGinn IP Law Group, PLLC

(57) ABSTRACT

Processing for obtaining processed compressed moving image data can be carried out efficiently through image enhancement processing on compressed moving image data. In a moving image processing unit of a relay server in a mobile phone system, a division unit divides compressed moving image data attached to an e-mail into a target part to be corrected and a non-target part not to be corrected. A decoding unit decodes the target part to generate decoded data. A correction unit carries out image enhancement processing on the decoded data, and obtains corrected decoded data. An encoding unit encodes the corrected decoded data, and obtains encoded corrected data. A combination unit combines the encoded corrected data with the non-target part, and obtains processed compressed moving image data.

14 Claims, 28 Drawing Sheets

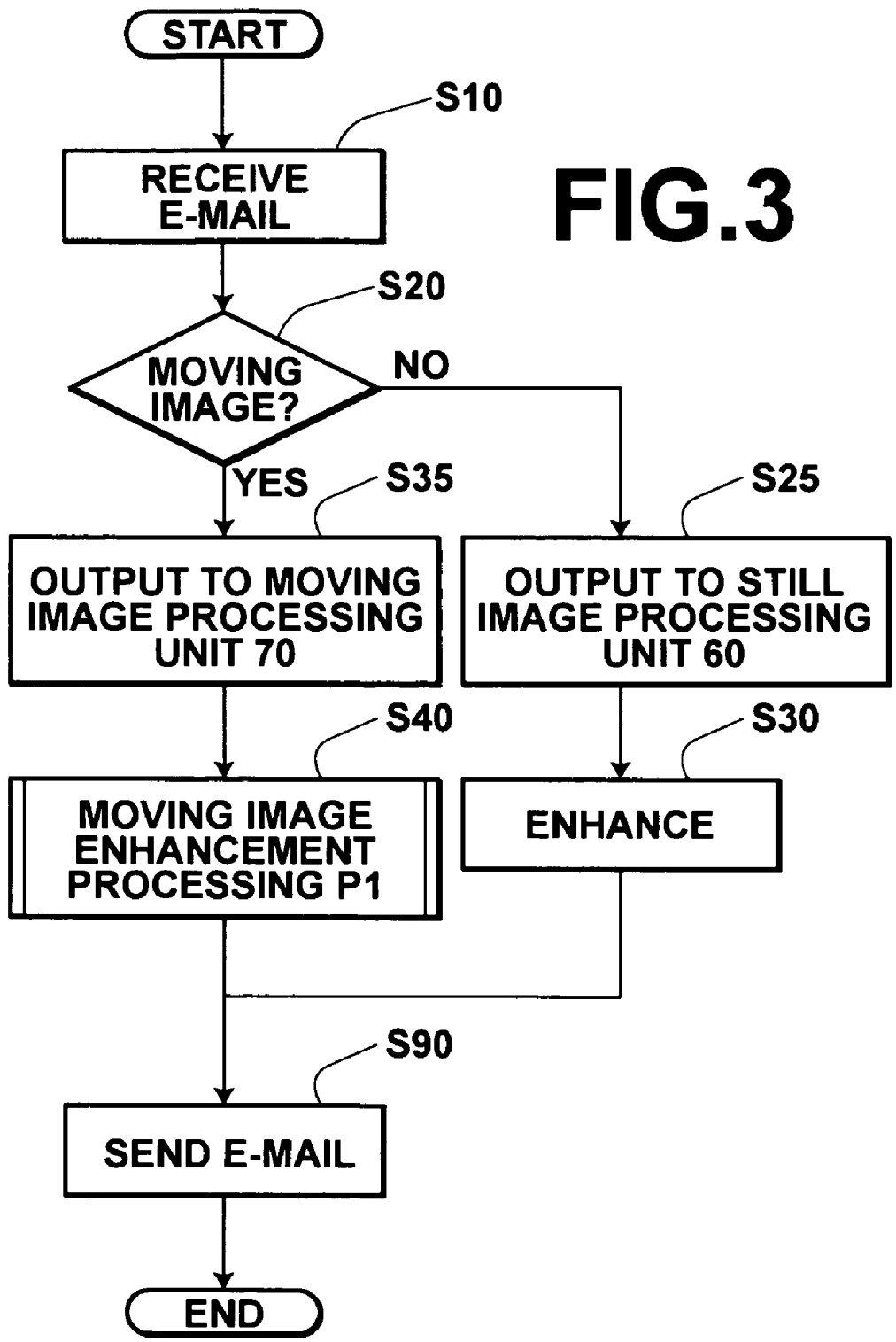

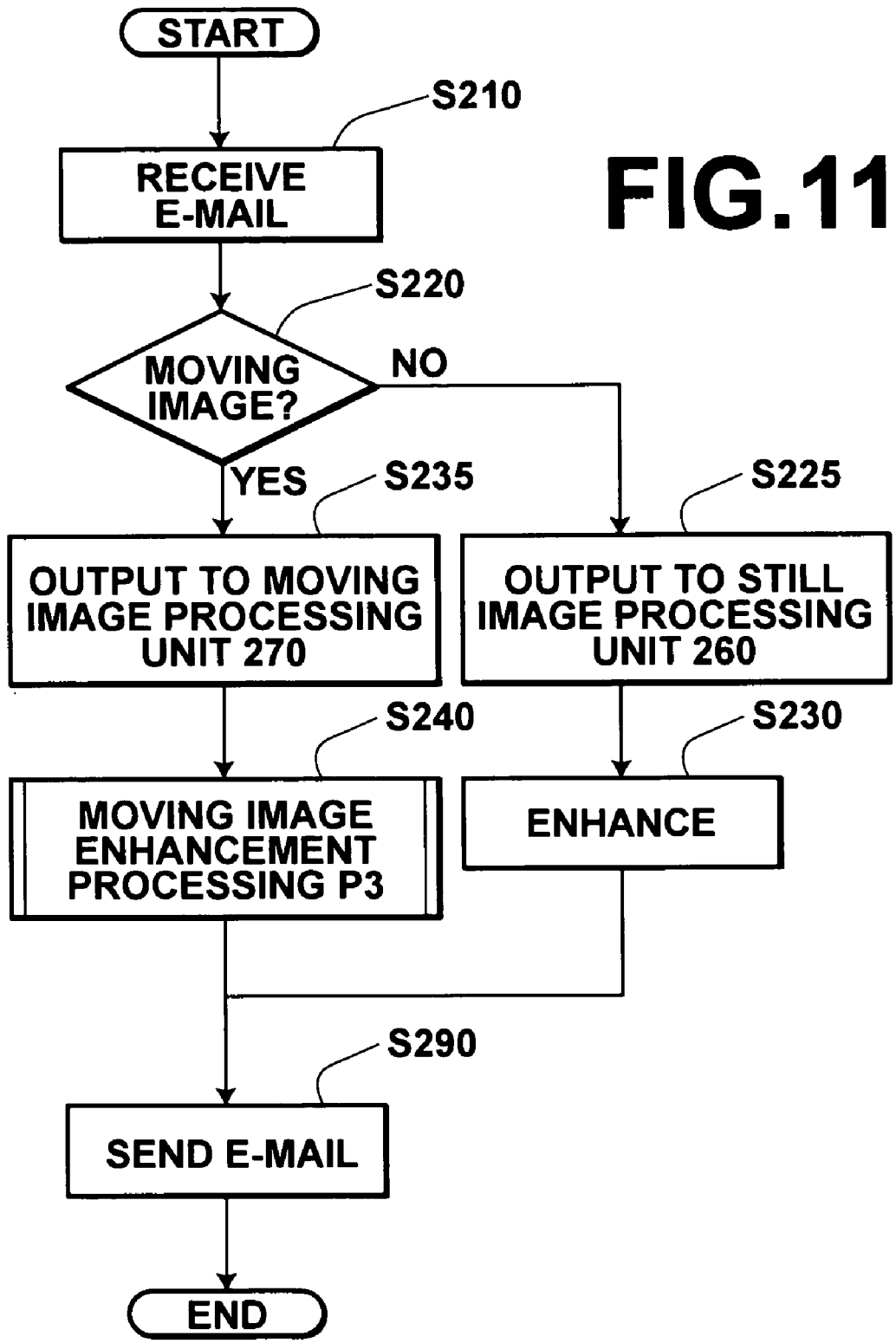

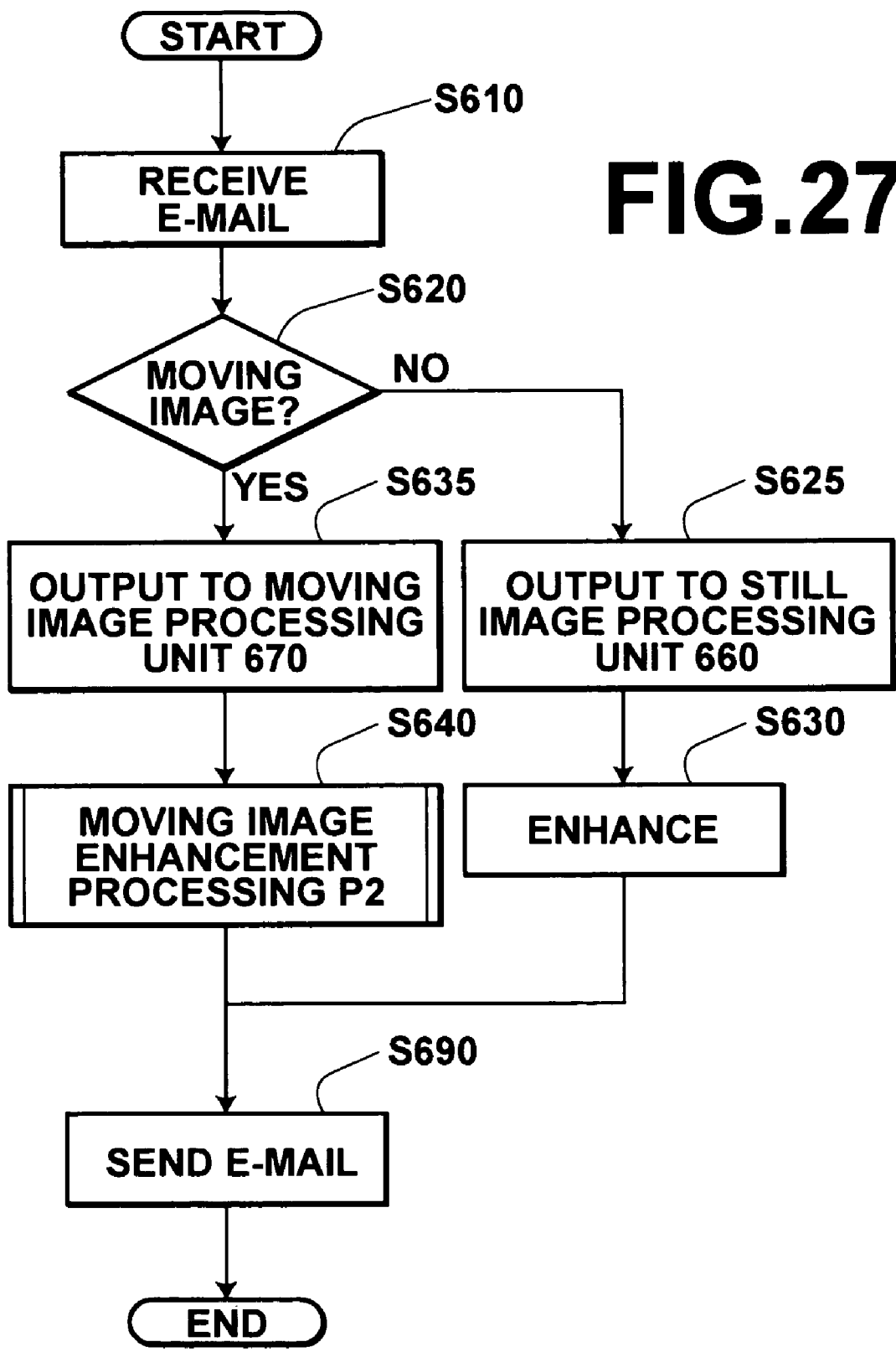

APPARATUS AND PROGRAM FOR IMAGE PROCESSING FOR OBTAINING PROCESSED COMPRESSED MOVING IMAGE DATA

BACKGROUND OF THE INVENTION

1. Field of the Invention

The present invention relates to an image processing apparatus. More specifically, the present invention relates to an apparatus and a program for obtaining processed compressed moving image data by carrying out image enhancement processing on compressed moving image data.

2. Description of the Related Art

For attractive moving-image display, processing such as gradation correction for improving image quality (hereinafter referred to as image enhancement processing) is carried out on a moving image obtained by photography. In Japanese Patent No. 3087409, a method is proposed for gradation correction. In this method, a video signal such as an NTSC signal is firstly subjected to A/D conversion to generate moving image data. A brightness histogram is then calculated regarding the moving image data, and a look-up table based on the histogram is generated and used for gradation correction.

Meanwhile, following the spread of digital cameras and camera-embedded mobile phones recently, a moving image is often dealt with as a video signal such as an NTSC signal as well as digitally compressed data according to a compression standard such as MPEG. Unlike photography of a still image, flash is difficult to use for a moving image. Therefore, a moving image photographed by an imaging device such as a digital camera tends to be dark. In order to display a moving image comprising image data having been subjected to digital compression, image enhancement processing is necessary as in the case of an analog signal such as an NTSC signal.

Such moving image data are recorded in a recording medium and sent in a state of being compressed. Therefore, a device for displaying the moving image data needs to carry out display processing on the moving image data on the premise that the moving image data have been compressed. Consequently, processed image data generated by image enhancement processing on the compressed moving image data need to be compressed according to the display device.

However, in order to obtain processed compressed moving image data through image enhancement processing, moving image data compressed digitally according to a compression standard such as MPEG (hereinafter referred to as compressed moving image data) are decoded first. The decoded data are then subjected to image enhancement processing. Thereafter, the corrected (enhanced) data are encoded to generate processed compressed moving image data. Since decoding and encoding moving image data requires a large amount of operations, this is time-consuming processing. This problem of long processing time is also noticed in the field of communication.

In the field of mobile communication as one form of communication, mobile terminals such as mobile phones have spread widely, and functions thereof have been improved. Consequently, services related to images are provided for such mobile terminals. For example, some communication relay servers have an image enhancement function. When an e-mail is relayed from a sender mobile phone to a receiver mobile phone, such a server carries out image enhancement processing such as gradation correction, white balance correction, density correction, and sharpness processing on image data attached to the e-mail sent from the sender mobile phone. Thereafter, the server sends the image data to the receiver mobile phone, or temporarily stores the image data for future downloading. If the image enhancement processing is not carried out fast in the server, a user feels stressful. Therefore, the service is not improved but degraded. Furthermore, if the time necessary for the image enhancement processing is long, the server needs to have a large-capacity storage device for storing the image data to be processed. In this manner, the server becomes more costly.

The same phenomenon is also observed in the field of video phones. If image enhancement processing cannot be carried out fast, a user cannot view an image of his/her counterpart in real time. Therefore, such a video phone becomes meaningless, and communication is not carried out smoothly.

This problem is also observed in other fields. For example, in the case where moving image data recorded in a recording medium such as a CD-ROM are displayed on a monitor of a computer, the computer carries out image enhancement processing for appropriate display of a moving image. However, if the image enhancement processing is prolonged, a user feels stressful as in the case of communication.

SUMMARY OF THE INVENTION

The present invention has been conceived based on consideration of the above circumstances. An object of the present invention is therefore to provide an image processing apparatus and a program that can efficiently generate processed compressed moving image data by carrying out image enhancement processing on compressed moving image data.

A first image processing apparatus of the present invention is an image processing apparatus for obtaining processed compressed moving image data by carrying out image enhancement processing on compressed moving image data. The first image processing apparatus comprises:

division means for dividing the compressed moving image data into a target part to be corrected and a non-target part not to be corrected;

decoding means for obtaining decoded data by decoding the target part;

correction means for obtaining corrected decoded data by carrying out the image enhancement processing on the decoded data;

encoding means for encoding the corrected decoded data; and combination means for obtaining the processed compressed moving image data by combining the target part that has been encoded with the non-target part.

The target part in the compressed moving image data refers to a part that affects an image quality of the entire moving image data if the part is enhanced.

The non-target part refers to a part that does not affect the image quality by enhancement thereon. Alternatively, the non-target part refers to a part that does not affect the image quality as the target part. In other words, the non-target part does not affect the image quality so much even if the image enhancement processing is not carried out thereon, and thus represents a part that does not need the image enhancement processing.

How the two parts can be distinguished depends on a compression method that generates the compressed moving image data. Moving image data generally comprise a plurality of frames. In one method of compression thereof, a first frame is independently used as a reference frame, and other frames are represented by a difference from the first frame. In this case, only the first frame has data that are independent of the other frames, and the other frames are represented by the difference from the first frame. Therefore, if the image enhancement processing is carried out on the first frame, the other frames are also corrected. In other words, the decoding processing necessary for the image enhancement processing is carried out only on the first frame. Therefore, the first frame is the target part and the other frames are the non-target part.

In this case, the first frame refers to a frame that comes first in a structure of the compressed moving image data, and does not necessarily refer to a frame that comes first in chronological order.

Meanwhile, intra frames and inter frames comprise compressed moving image data generated according to MPEG that is becoming a mainstream standard for a moving image industry, according to ITU-T H.261 and ITU-T H263 used for video phones, and according to a method such as Nancy adopted as a moving image compression standard for mobile phones. Each of intra frames has data that are not dependent on data of other frames, and inter frames comprise a difference between the frames. In such a case, if the image enhancement processing is carried out on the intra frames, the inter frames that comprise the data depending on the intra frames are also corrected. Therefore, the decoding processing necessary for the image enhancement processing is carried out on the intra frames alone. Consequently, the intra frames are the target part and the inter frames are the non-target part.

Although inter frames do comprise a difference between frames and are dependent on data of intra frames, how inter frames are dependent on other frames may differ, depending on a compression method. For example, in the case of compressed moving image data comprising I frames, P frames, and B frames, the I frames are independent of other frames. The P frames and the B frames comprise a difference between the frames and are not independent. However, each of the P frames is dependent only on a previous (past) one of the frames while each of the B frames is dependent on a previous one of the frames and a subsequent (future) one of the frames. Therefore, the P frames are more independent than the B frames, and an image quality can be improved more by carrying out the image enhancement processing on the P frames. In this case, the I frames and the P frames are the target part while the B frames are the non-target part.

In order to carry out the image enhancement processing on the target part by the correction means, the target part needs to be decoded first by the decoding means. It is preferable for the decoding means of the first image processing apparatus of the present invention to decode the target part to a degree that enables the correction means to carry out the image enhancement processing thereon. Moving image data are often compressed in a stepwise manner, and decoding processing is carried out through inverse operations in the reverse order of compression. For example, if moving image data compressed according to MPEG are decoded, variable-length decoding is carried out first thereon. The data after the variable-length decoding are then decomposed into motion vectors, DCT coefficients, and the like. Motion estimation and compensation and IDCT that is the inverse of DCT are further carried out thereon. Since the image enhancement processing can be carried out on the DCT coefficients, the decoding processing does not need to be carried out up to the step of IDCT. Therefore, the decoding means does not carry out IDCT, and provides the DCT coefficients to the correction means. The correction means then carries out the image enhancement processing on the DCT coefficients. Upon the step of encoding thereafter, the corrected DCT coefficients can be used, and the step of finding the DCT coefficients becomes unnecessary. In this manner, the time necessary for the encoding processing can also be shortened.

A second image processing apparatus of the present invention is an apparatus for obtaining processed compressed moving image data by carrying out image enhancement processing on compressed moving image data obtained according to a compression method using a first frame as a reference frame. The second image processing apparatus comprises:

division means for dividing the compressed moving image data into the first frame and other frames;

decoding means for obtaining a decoded first frame by decoding the first frame;

correction means for obtaining a corrected decoded first frame by carrying out the image enhancement processing on the decoded first frame;

encoding means for obtaining a corrected first frame by encoding the corrected decoded first frame; and combination means for obtaining the processed compressed moving image data by combining the corrected first frame with the other frames.

A third image processing apparatus of the present invention is an apparatus for obtaining processed compressed moving image data by carrying out image enhancement processing on compressed moving image data comprising intra frames and inter frames. The third image processing apparatus comprises:

division means for dividing the compressed moving image data into the intra frames and the inter frames;

decoding means for obtaining decoded intra frames by decoding the intra frames;

correction means for obtaining corrected decoded intra frames by carrying out the image enhancement processing on the decoded intra frames;

encoding means for obtaining corrected intra frames by encoding the corrected decoded intra frames; and combination means for obtaining the processed compressed moving image data by combining the corrected intra frames with the inter frames.

As has been described above, compressed moving image data obtained by compression according to MPEG or the like comprise intra frames and inter frames. Inter frames are generally dependent on intra frames. However, inter frames may include independent data (that is, data that are not dependent on other frame) in some cases. The independent data are called intra blocks while the dependent data are called inter blocks. For dealing with such a case, it is preferable for the third image processing apparatus of the present invention to further comprise block division means for dividing the inter frames into intra blocks and inter blocks. In this case, the decoding means further obtains decoded intra blocks by decoding the intra blocks, and the correction means further obtains corrected decoded intra blocks by carrying out the image enhancement processing on the decoded intra blocks. The encoding means also obtains corrected intra blocks by encoding the corrected decoded intra blocks, and the combination means obtains the processed compressed moving image data by combining the corrected intra frames and the corrected intra blocks with the inter blocks.

A fourth image processing apparatus of the present invention is an apparatus for obtaining processed compressed moving image data by carrying out image enhancement processing on compressed moving image data comprising I frames, P frames, and B frames. The fourth image processing apparatus comprises:

division means for dividing the compressed moving image data into the I frames, the P frames and the B frames;

decoding means for obtaining decoded I frames and decoded P frames by decoding the I frames and the P frames;

correction means for obtaining corrected decoded I frames and corrected decoded P frames by carrying out the image enhancement processing on the decoded I frames and on the decoded P frames;

encoding means for obtaining corrected I frames and corrected P frames by encoding the corrected decoded I frames and the corrected decoded P frames; and combination means for obtaining the processed compressed moving image data by combining the corrected I frames and the corrected P frames with the B frames.

It is preferable for the fourth image processing apparatus of the present invention to further comprise block division means for dividing the B frames into intra blocks and inter blocks. In this case, the decoding means further obtains decoded intra blocks by decoding the intra blocks, and the correction means obtains corrected decoded intra blocks by carrying out the image enhancement processing on the decoded intra blocks. The encoding means then obtains corrected intra blocks by encoding the corrected decoded intra blocks, and the combination means obtains the processed compressed moving image data by combining the corrected I frames, the corrected P frames, and the corrected intra blocks with the inter blocks.

A fifth image processing apparatus of the present invention is an apparatus for obtaining processed compressed moving image data by carrying out image enhancement processing on compressed moving image data mainly comprising DCT coefficient data and motion vector data of each frame. The fifth image processing apparatus comprises:

extraction means for extracting the DCT coefficient data and the motion vector data from the compressed moving image data;

decoding means for obtaining decoded data by decoding the compressed moving image data with use of the DCT coefficient data and the motion vector data;

correction means for obtaining corrected decoded data by carrying out the image enhancement processing on the decoded data; and encoding means for obtaining the processed compressed moving image data by encoding the corrected decoded data. The fifth image processing apparatus is characterized by that the encoding means encodes the corrected decoded data by using the motion vector data obtained by the extraction means.

Compressed image data according to MPEG mainly comprise a DCT coefficient and a motion vector of each frame, in addition to header information representing whether each frame is an intra frame or an inter frame. The motion vector is necessary when the compressed moving image data are decoded and when the compressed moving image data having being subjected to decoding and image enhancement processing are encoded. The fifth image processing apparatus of the present invention pays attention to the fact that finding the motion vector requires a large amount of operations upon encoding, although the motion vector does not substantially affect an image quality such as tones. Therefore, the motion vector is not newly found upon the encoding processing, and the motion vector used upon the decoding processing is used therefor. In this manner, the time necessary for generating the processed compressed moving image data can be shortened.

A sixth image processing apparatus of the present invention is an apparatus for obtaining processed compressed moving image data by carrying out image enhancement processing on compressed moving image data comprising a plurality of frames. The sixth image processing apparatus comprises:

division means for dividing the compressed moving image data into target frames and non-target frames;

decoding means for obtaining decoded frames by decoding the target frames;

correction means for obtaining corrected decoded frames by carrying out the image enhancement processing on the decoded frames;

encoding means for obtaining corrected frames by encoding the corrected decoded frames; and combination means for obtaining the processed compressed moving image data by combining the corrected frames with the non-target frames. The sixth image processing apparatus is characterized by that the correction means comprises:

correction parameter calculation means for calculating a correction parameter for each of the decoded frames by using data of the corresponding decoded frame;

parameter adjustment means for obtaining an adjusted parameter for each of the decoded frames by adjusting the correction parameter thereof, with use of the correction parameter for the decoded frame or frames that precedes and/or follows the decoded frame corresponding to the correction parameter that is going to be adjusted; and correction execution means for carrying out the image enhancement processing on each of the decoded frames by using the adjusted parameter.

The target frames refer to frames that affect an image quality of the entire moving image data if the image enhancement processing is carried out thereon.

The non-target frames refer to frames that do not affect the image quality of the entire moving image data by enhancement thereof. Alternatively, the non-target frames refer to frames that do not affect the image quality as the target frames. In other words, the non-target frames do not affect the image quality so much even if the image enhancement processing is not carried out thereon, and thus represent frames that do not need the image enhancement processing.

How the target frames and the non-target frames can be distinguished depends on a compression method that generates the compressed moving image data. Moving image data generally comprises a plurality of frames, and intra frames and inter frames comprise moving image data compressed according to MPEG that is becoming a mainstream standard of a moving image industry, according to ITU-T H.261 and ITU-T H263 used for video phones and the like, and according to a method such as Nancy adopted as a standard of moving image compression for mobile phones. Each of intra frames has data that are not dependent on data of other frames, and inter frames comprise a difference between the frames. In such a case, if the image enhancement processing is carried out on the intra frames, the inter frames that comprise the data depending on the intra frames are also corrected. Therefore, the decoding processing necessary for the image enhancement processing is carried out on the intra frames alone. Consequently, the intra frames are the target frames and the inter frames are the non-target frames.

Although inter frames do comprise a difference between frames and are dependent on data of intra frames, how inter frames are dependent on other frames may differ, depending on a compression method. For example, in the case of compressed moving image data comprising I frames, P frames, and B frames, the I frames are frames that are independent of other frames. The P frames and the B frames comprise a difference between the frames and are not independent. However, each of the P frames is dependent only on a previous (past) one of the frames while each of the B frames is dependent on a previous one of the frames and a subsequent (future) one of the frames. Therefore, the P frames are more independent than the B frames, and an image quality can be improved more by carrying out image enhancement processing on the P frames. In this case, the I frames and the P frames are preferably used as the target frames while the B frames are used as the non-target frames in the sixth image processing apparatus, although the I frames alone may be used as the target frames while the P and B frames are used as the non-target frames.

Upon carrying out the image enhancement processing on the decoded frames obtained through decoding of the target frames by the decoding means, the correction means of the sixth image processing apparatus of the present invention calculates the correction parameter for each of the decoded frames based on the data thereof, by using the correction parameter calculation means. The parameter adjustment means of the correction means then adjusts the correction parameter of each of the decoded frames by using the correction parameter of the preceding and/or following decoded frame or frames. The correction execution means in the correction means then carries out the image enhancement processing on each of the decoded frames by using the adjusted parameter thereof.

The parameter adjustment means may set the adjusted parameter for each of the decoded frames as an average of the correction parameter thereof and the correction parameter of at least one of the decoded frames that precedes and/or follows the corresponding decoded frame.

A seventh image processing apparatus of the present invention is an apparatus for obtaining processed compressed moving image data by carrying out image enhancement processing on compressed moving image data comprising an intra frame and inter frames. The seventh image processing apparatus comprises:

division means for dividing the compressed moving image data into the intra frame, target inter frames and non-target inter frames;

decoding means for obtaining decoded frames comprising a decoded intra frame and decoded target inter frames by decoding the intra frame and the target inter frames;

correction means for obtaining corrected decoded frames by carrying out the image enhancement processing on the decoded frames;

encoding means for obtaining corrected frames by encoding the corrected decoded frames; and combination means for obtaining the processed compressed moving image data by combining the corrected frames with the non-target inter frames. The seventh image processing apparatus is characterized by that the correction means carries out the image enhancement processing on the decoded intra frame by calculating a correction parameter therefor and on the decoded target inter frames by using the correction parameter of the decoded intra frame that immediately precedes the decoded target inter frames.

The non-target inter frames refer to frames that are not independent, and do not affect an image quality of the entire moving image data even if the image enhancement processing is carried out thereon. The target inter frames refer to frames that affect the image quality of the moving image data more than the non-target inter frames if the image enhancement processing is carried out thereon, although the target inter frames are also not independent. More specifically, as has been described above, compressed moving image data according to a compression method such as MPEG comprise intra frames (such as the I frames described above) and inter frames. The inter frames can be divided into frames of low dependency (such as the P frames) and frames of high dependency (such as the B frames). In this case, the I frames can be the intra frame in the seventh image processing apparatus while the P frames and the B frames are the target inter frames and the non-target inter frames, respectively.

In other words, the seventh image processing apparatus of the present invention obtains the corrected frames by carrying out the decoding processing, the image enhancement processing, and the encoding processing on the intra frame and on the target inter frames. The processed compressed moving image data are then obtained by combining the corrected frames with the non-target inter frames. The correction means, which carries out the image enhancement processing on the decoded intra frame and on the decoded target inter frames, calculates the correction parameter for the decoded intra frame alone and does not find the correction parameter for the decoded target inter frames. However, the correction means also carries out the image enhancement processing on each of the decoded inter frames by using the correction parameter of the immediately preceding decoded intra frame.

In some cases, compressed moving image data are obtained by a compression method that causes only a first frame to become an intra frame. In such compressed moving image data, only the first frame is the intra frame, and the immediately preceding decoded intra frame refers to the decoded first frame for all the target inter frames. In this case, the correction means calculates the correction parameter for the decoded first frame, and carries out the image enhancement processing thereon. The correction means also carries out the image enhancement processing on all the target inter frames by using the correction parameter for the decoded first frame.

In this case, the first frame refers to a frame that comes first in a structure of the compressed moving image data, and does not necessarily refer to the frame that comes first in chronological order.

A first program of the present invention is a program that causes a computer to carry out image processing for obtaining processed compressed moving image data through image enhancement processing on compressed moving image data. The image processing comprises the steps of:

dividing the compressed moving image data into a target part to be corrected and a non-target part not to be corrected;

decoding the target part for obtaining decoded data;

carrying out the image enhancement processing on the decoded data for obtaining corrected decoded data;

encoding the corrected decoded data; and combining the target part that has been encoded with the non-target part for obtaining the processed compressed moving image data.

A second program of the present invention is a program that causes a computer to carry out image processing for obtaining processed compressed moving image data through image enhancement processing on compressed moving image data obtained according to a compression method using a first frame as a reference frame. The image processing comprises the steps of:

dividing the compressed moving image data into the first frame and other frames;

decoding the first frame for obtaining a decoded first frame;

carrying out the image enhancement processing on the decoded first frame for obtaining a corrected decoded first frame;

encoding the corrected decoded first frame for obtaining a corrected first frame; and combining the corrected first frame with the other frames for obtaining the processed compressed moving image data.

A third program of the present invention is a program that causes a computer to carry out image processing for obtaining processed compressed moving image data through image enhancement processing on compressed moving image data comprising intra frames and inter frames. The image processing comprises the steps of:

dividing the compressed moving image data into the intra frames and the inter frames;

decoding the intra frames for obtaining decoded intra frames;

carrying out the image enhancement processing on the decoded intra frames for obtaining corrected decoded intra frames;

encoding the corrected decoded intra frames for obtaining corrected intra frames; and combining the corrected intra frames with the inter frames for obtaining the processed compressed moving image data.

In this case, it is preferable for the step of dividing to further comprise the step of dividing the inter frames into intra blocks and inter blocks. Consequently, the step of decoding is also the step of decoding the intra blocks as well for obtaining decoded intra blocks, and the step of carrying out the image enhancement processing is the step of carrying out the image enhancement processing on the decoded intra blocks as well for obtaining corrected decoded intra blocks. The step of encoding is also the step of encoding the corrected decoded intra blocks as well for obtaining corrected intra blocks, and the step of combining is the step of combining the corrected intra frames and the corrected intra blocks with the inter blocks for obtaining the processed compressed moving image data.

A fourth program of the present invention is a program that causes a computer to carry out image processing for obtaining processed compressed moving image data through image enhancement processing on compressed moving image data comprising I frames, P frames, and B frames. The image processing comprises the steps of:

dividing the compressed moving image data into the I frames, the P frames and the B frames;

decoding the I frames and the P frames for obtaining decoded I frames and decoded P frames;

carrying out the image enhancement processing on the decoded I frames and on the decoded P frames for obtaining corrected decoded I frames and corrected decoded P frames;

encoding the corrected decoded I frames and the corrected decoded P frames for obtaining corrected I frames and corrected P frames; and combining the corrected I frames and the corrected P frames with the B frames for obtaining the processed compressed moving image data.

It is preferable for the step of dividing to further comprise the step of dividing the B frames into intra blocks and inter blocks. Consequently, the step of decoding is the step of decoding the intra blocks as well for obtaining decoded intra blocks, and the step of carrying out the image enhancement processing is the step of carrying out the image enhancement processing on the decoded intra blocks as well for obtaining corrected decoded intra blocks. The step of encoding is also the step of encoding the corrected decoded intra blocks for obtaining corrected intra blocks, and the step of combining is the step of combining the corrected I frames, the corrected P frames, and the corrected intra blocks with the inter blocks for obtaining the processed compressed moving image data.

A fifth program of the present invention is a program that causes a computer to carry out image processing for obtaining processed compressed moving image data through image enhancement processing on compressed moving image data mainly comprising DCT coefficient data and motion vector data of each frame. The image processing comprises the steps of:

extracting the DCT coefficient data and the motion vector data from the compressed moving image data;

decoding the compressed moving image data with use of the DCT coefficient data and the motion vector data for obtaining decoded data;

carrying out the image enhancement processing on the decoded data for obtaining corrected decoded data; and encoding the corrected decoded data for obtaining the processed compressed moving image data. It is preferable for the step of encoding is the step of encoding the corrected decoded data by using the motion vector data obtained at the step of extracting.

A sixth program of the present invention is a program that causes a computer to carry out image processing for obtaining processed compressed moving image data through image enhancement processing on compressed moving image data comprising a plurality of frames. The image processing comprises the steps of:

dividing the compressed moving image data into target frames and non-target frames;

decoding the target frames for obtaining decoded frames;

carrying out the image enhancement processing on the decoded frames for obtaining corrected decoded frames;

encoding the corrected decoded frames for obtaining corrected frames; and combining the corrected frames with the non-target frames for obtaining the processed compressed moving image data. The sixth program is characterized by that the step of carrying out the image enhancement processing further comprises the steps of:

calculating a correction parameter for each of the decoded frames by using data of the corresponding decoded frame;

obtaining an adjusted parameter for each of the decoded frames by adjusting the correction parameter thereof with use of the correction parameter for the decoded frame or frames that precedes and/or follows the decoded frame corresponding to the correction parameter that is going to be adjusted; and carrying out the image enhancement processing on each of the decoded frames by using the adjusted parameter.

A seventh program of the present invention is a program that causes a computer to carry out image processing for obtaining processed compressed moving image data through image enhancement processing on compressed moving image data comprising an intra frame and inter frames. The image processing comprises the steps of:

dividing the compressed moving image data into the intra frame, target inter frames and non-target inter frames;

decoding the intra frame and the target inter frames for obtaining decoded frames comprising a decoded intra frame and decoded target inter frames;

carrying out the image enhancement processing on the decoded frames for obtaining corrected decoded frames;

encoding the corrected decoded frames for obtaining corrected frames; and combining the corrected frames with the non-target inter frames for obtaining the processed compressed moving image data. The seventh program is characterized by that the step of carrying out the image enhancement processing is the step of carrying out the image enhancement processing on the decoded intra frame by calculating a correction parameter therefor and on the decoded target inter frames by using the correction parameter of the decoded intra frame that immediately precedes the decoded target inter frames.

According to the first image processing apparatus of the present invention, the compressed moving image data are firstly divided into the target part and the non-target part when the processed compressed moving image data are obtained by carrying out the image enhancement processing on the compressed moving image data. The target part that affects the image quality is then subjected to the decoding processing and the image enhancement processing. Consequently, without carrying out the decoding processing and the image enhancement processing on the non-target part, the compressed moving image data can be processed into the processed compressed moving image data that realizes beautiful display thereof. In addition, the time necessary for generating the processed compressed moving image data can be shortened.

In the first image processing apparatus of the present invention, if the decoding means carries out the decoding processing on the target part to the degree that allows the correction means to carry out the image enhancement processing thereon, the time necessary for the decoding processing can also be shortened.

In the second image processing apparatus of the present invention, the first frame is separated from the compressed moving image data generated according to the compression method using the first frame as the reference frame, and only the first frame is subjected to the decoding processing, the image enhancement processing, and the encoding processing. Thereafter, the processed compressed moving image data are obtained by combining the corrected first frame with the other frames. In this manner, the decoding processing and the image enhancement processing do not need to be carried out on the other frames represented by the difference from the first frame, and the processed compressed moving image data enabling appropriate display thereof can be obtained while the time necessary therefor can be shortened.

According to the third image processing apparatus of the present invention, the intra frames are separated from the inter frames in the compressed moving image data, and the decoding processing, the image enhancement processing, and the encoding processing are carried out only on the intra frames. The processed compressed moving image data are then obtained by combining the corrected intra frames with the inter frames. Therefore, the decoding processing, the image enhancement processing, and the encoding processing can be saved from being carried out on the inter frames that are expressed by the difference between the frames. In this manner, the compressed moving image data can be corrected to become the processed compressed moving image data that enables appropriate display thereof, and the time necessary therefor can be shortened.

If the third image processing apparatus further comprises the block division means for dividing the inter frames into the inter blocks and the intra blocks and if the image enhancement processing (and the decoding processing necessary therefor and the encoding processing) is carried out on the intra blocks as well, the image quality can be improved further.

According to the fourth image processing apparatus of the present invention, the compressed moving image data are divided into the I frames, the P frames, and the B frames, and the decoding processing, the image enhancement processing, and the encoding processing are carried out only on the I frames and the P frames. The processed compressed moving image data are then obtained by combining the B frames with the corrected I frames and the corrected P frames. Therefore, the decoding processing, the image enhancement processing, and the encoding processing are not carried out on the inter frames represented by the difference from the preceding and subsequent frames. In this manner, the compressed moving image data can be corrected into the processed compressed moving image data enabling appropriate display thereof while the time necessary therefor can be shortened.

If the fourth image processing apparatus further comprises the block division means for dividing the B frames into the intra blocks and the inter blocks, and if the image enhancement processing (and the decoding processing necessary therefor and the encoding processing) is carried out on the intra blocks as well, the image quality can be improved more.

The fifth image processing apparatus of the present invention extracts the DCT coefficient data and the motion vector data from the compressed moving image data, and the decoding processing as well as the image enhancement processing are carried out on the compressed moving image data by using the DCT coefficient data and the motion vector data. When the corrected image data are subjected to the encoding processing, the motion vector data are not newly found and the motion vector data that have been extracted in the decoding processing are used for the encoding processing. In this manner, the moving image data can be corrected appropriately in terms of image quality while operations for finding the motion vector data upon encoding can be avoided. Consequently, the processed compressed moving image data can be generated efficiently.

When image enhancement processing is carried out on compressed moving image data comprising a plurality of frames, if a correction parameter for each of frames to be corrected (such as intra frames) is found by using data of the corresponding frame, the correction parameter may change substantially in some cases, depending on a change of a scene in the frame. In such a case, a brightness change leading to flicker of images becomes large when the processed compressed moving image data are displayed after being corrected according to the correction parameter found in the above manner. Therefore, a user who views the image data becomes uncomfortable. According to the sixth image processing apparatus of the present invention, the compressed moving image data are divided into the target frames and the non-target frames. The corrected frames are then obtained by carrying out the decoding processing, the image enhancement processing and the encoding processing only on the target frames. At this time, the decoded frames are obtained first by decoding the target frames. The correction parameter that is found based on the data of each of the decoded frames is then adjusted based on the correction parameter found from the preceding and/or following decoded frame or frames. The image enhancement processing is thereafter carried out on the decoded frames with use of the adjusted parameter. The corrected frames obtained after the subsequent encoding processing are combined with the non-target frames to generate the processed compressed moving image data. In this manner, an amount of data to be decoded and encoded can be reduced for shorter processing time. In addition, at the time of display of the processed compressed moving image data, a change in brightness thereof can be suppressed by the adjustment of the correction parameter.

The seventh image processing apparatus of the present invention divides the compressed moving image data into the intra frame, the target inter frames and the non-target inter frames. The decoding processing, the image enhancement processing, and the encoding processing are carried out only on the intra frame and on the target inter frames to generate the corrected frames. The corrected frames are then combined with the non-target inter frames to generate the processed compressed moving image data. When the image enhancement processing is carried out, the correction parameter is found based on the decoded intra frame. The correction parameter is not found for the target inter frames, but the correction parameter of the intra frame immediately preceding each of the target inter frames is used as the correction parameter therefor. Thereafter, the image enhancement processing is carried out with use of the correction parameter. In this manner, an amount of data to be decoded and encoded can be reduced for shorter processing time, and a sudden change in the correction parameter can be prevented. In addition, a brightness change in the processed compressed moving image data can also be prevented at the time of display thereof.

BRIEF DESCRIPTION OF THE DRAWINGS

FIG. 3 is a flow chart showing the operation of the relay server 100 shown in FIG. 2;

FIG. 11 is a flow chart showing the operation of the relay server 300 shown in FIG. 10;

FIG. 27 is a flow chart showing the operation of the relay server 700 shown in FIG. 26.

DESCRIPTION OF THE PREFERRED EMBODIMENTS

Hereinafter, embodiments of an image processing apparatus and a program of the present invention will be explained with reference to the accompanying drawings. In the explanations below, an "image" is represented by "image data", and the image and the image data are used to represent the same object.

Figure 1:
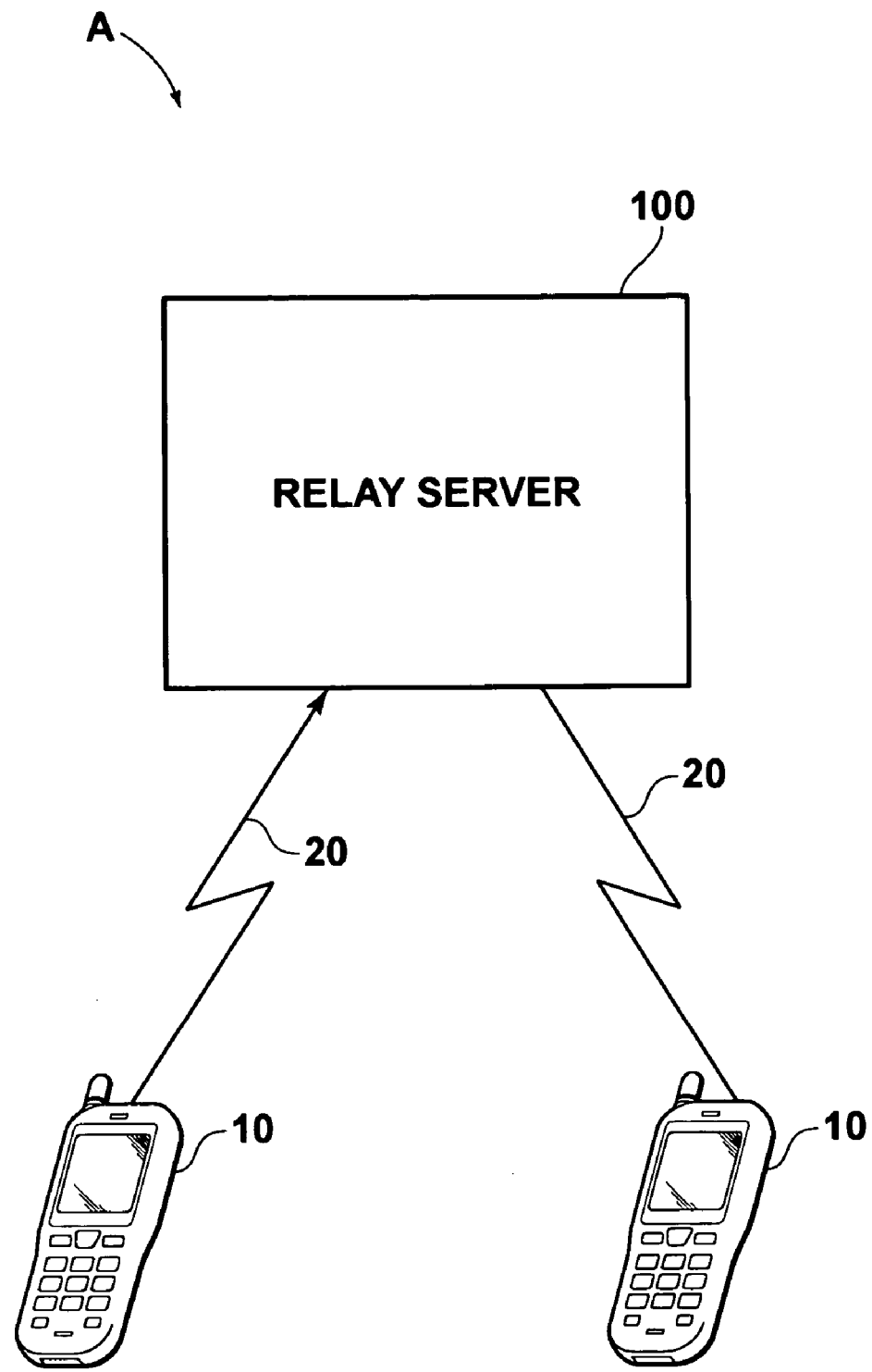
FIG. 1 is a block diagram showing a configuration of a mobile phone system A as a first embodiment of an image processing apparatus and an image processing program of the present invention.

FIG. 1 is a block diagram showing a configuration of a mobile phone system A as a first embodiment of the image processing apparatus and the program of the present invention. As shown in FIG. 1, the mobile phone system A in the first embodiment comprises a plurality of mobile phones 10 and a relay server 100 for relaying communication between the mobile phones 10. The mobile phones 10 are connected to the relay server 100 by a mobile phone communication network 20. The relay server 100 relays voice communication as well as e-mails between the mobile phones 10. Hereinafter, for the sake of better understanding of the scope of the present invention, the operation of the relay server 100 will be explained in detail in the case where an e-mail attached with image data is sent and received between two of the mobile phones 10.

Figure 2A:
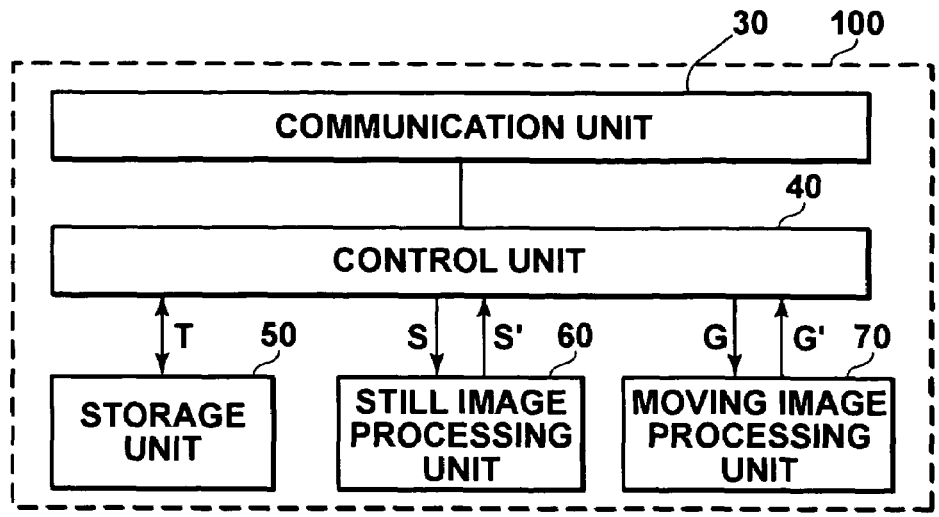
FIGS. 2A and 2B are block diagrams showing a configuration of a relay server 100 in the mobile phone system A shown in FIG. 1.
Figure 2B:
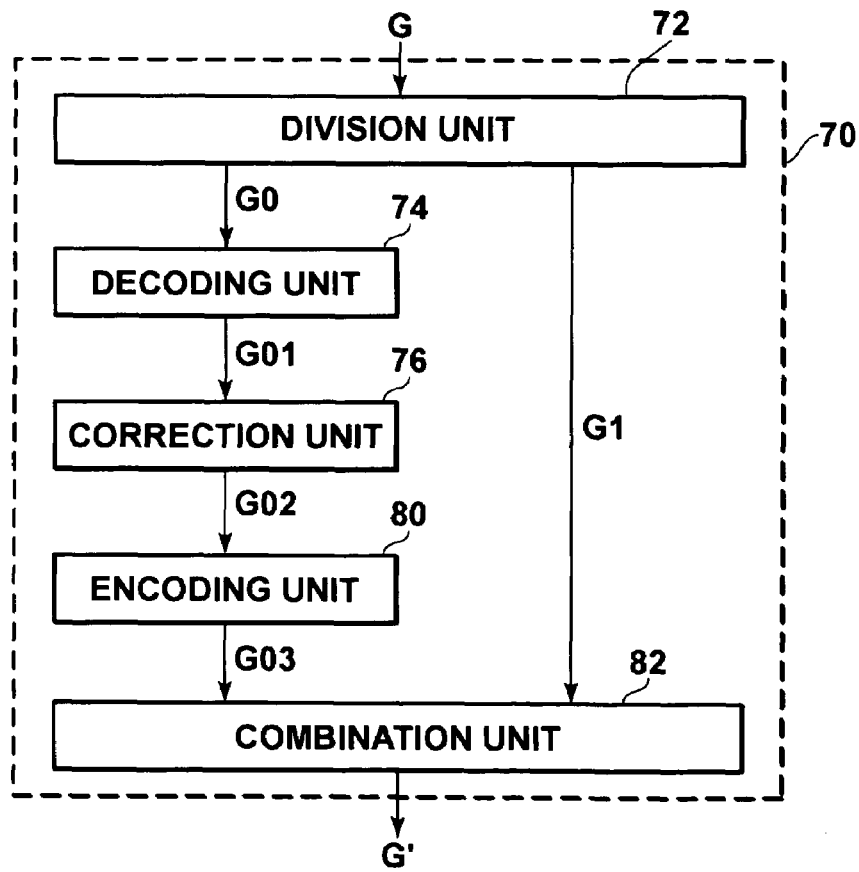

FIGS. 2A and 2B are block diagrams showing a configuration of the relay server 100 in the mobile phone system A shown in FIG. 1. As shown in FIG. 2A, the relay server 100 in the mobile phone system A comprises a communication unit 30, a control unit 40, a storage unit 50, a still image processing unit 60, and a moving image processing unit 70. The communication unit 30 carries out radio transmission and reception to and from the mobile phones 10. The control unit 40 controls the operation of the entire server 100 including the communication unit 30. The storage unit 50 stores data T excluding the image attached to the e-mail, under the control of the control unit 40. The still image processing unit 60 carries out image enhancement processing on a still image S attached to the e-mail, and obtains a corrected still image S'. The moving image processing unit 70 carries out image enhancement processing on a moving image G attached to the e-mail, and obtains a corrected moving image G'.

The still image S, the corrected still image S', the moving image G, and the corrected moving image G' are all compressed.

The control unit 40 stores in the storage unit 50 the data T of the e-mail received from one of the two mobile phones 10 as a sender via the communication unit 30. As has been described above, the data T do not include the image attached to the e-mail. The control unit 40 also outputs the attached image to the still image processing unit 60, in the case where the attached image is the still image S. The control unit 40 then causes the still image processing unit 60 to carry out the image enhancement processing on the still image S, and obtains the corrected still image S'. In the case where the attached image is the moving image G, the control unit 40 outputs the attached image to the moving image processing unit 70, and causes the moving image processing unit 70 to carry out the image enhancement processing on the moving image G. In this manner, the corrected moving image G' is obtained. The control unit 40 attaches the corrected still image S' or the corrected moving image G' to the data T stored in the storage unit 50, and sends the e-mail attached with the processed image to the other mobile phone 10 as a receiver via the communication unit 30.

FIG. 2B is a block diagram showing a configuration of the moving image processing unit 70 in the relay server 100 shown in FIG. 2A. As shown in FIG. 2B, the moving image processing unit 70 comprises a division unit 72, a decoding unit 74, a correction unit 76, an encoding unit 80, and a combination unit 82. The division unit 72 divides the compressed moving image data G into target data G0 to be corrected and non-target data G1 that are not corrected. The decoding unit 74 obtains decoded data G01 by decoding the target data G0. The correction unit 76 obtains corrected decoded data G02 by carrying out the image enhancement processing on the decoded data G01. The encoding unit 80 obtains encoded corrected data G03 by encoding the corrected decoded data G02. The combination unit 82 obtains the corrected moving image data G' by combining the encoded corrected data G03 with the non-target data G1.

The decoding unit 74 carries out the decoding processing on the target data G0 to a degree that enables the correction unit 76 to carry out the image enhancement processing thereafter.

FIG. 3 is a flow chart showing the operation of the relay server 100. When the relay server 100 receives via the communication unit 30 the e-mail sent from the sender mobile phone 10 with the image being attached thereto (Step S10), the control unit 40 judges whether the attached image is the still image S or the moving image G (Step S20). In the case where the attached image is the still image S (Step S20: NO), the control unit 40 stores the data T excluding the attached image in the storage unit 50, and outputs the still image S to the still image processing unit 60 (Step S25). The still image processing unit 60 carries out the image enhancement processing such as tone correction on the still image S, and obtains the corrected still image S' (Step S30). The control unit 40 attaches the corrected still image S' to the data T stored in the storage unit 50, and sends the e-mail attached with the corrected image to the receiver mobile phone 10 via the communication unit 30 (Step S90).

In the case where the attached image has been judged to be the moving image G at Step S20 (Step S20: YES), the control unit 40 stores the data T excluding the attached image in the storage unit 50, and outputs the moving image G to the moving image processing unit 70 (Step S35). The moving image processing unit 70 carries out the image enhancement processing such as tone correction (hereinafter referred to as moving image enhancement processing P1) on the moving image G, and obtains the corrected moving image G' (Step S40). The control unit 40 attaches the corrected moving image G' to the data T stored in the storage unit 50, and sends the e-mail attached with the corrected image to the receiver mobile phone 10 via the communication unit 30 (Step S90).

Figure 4:
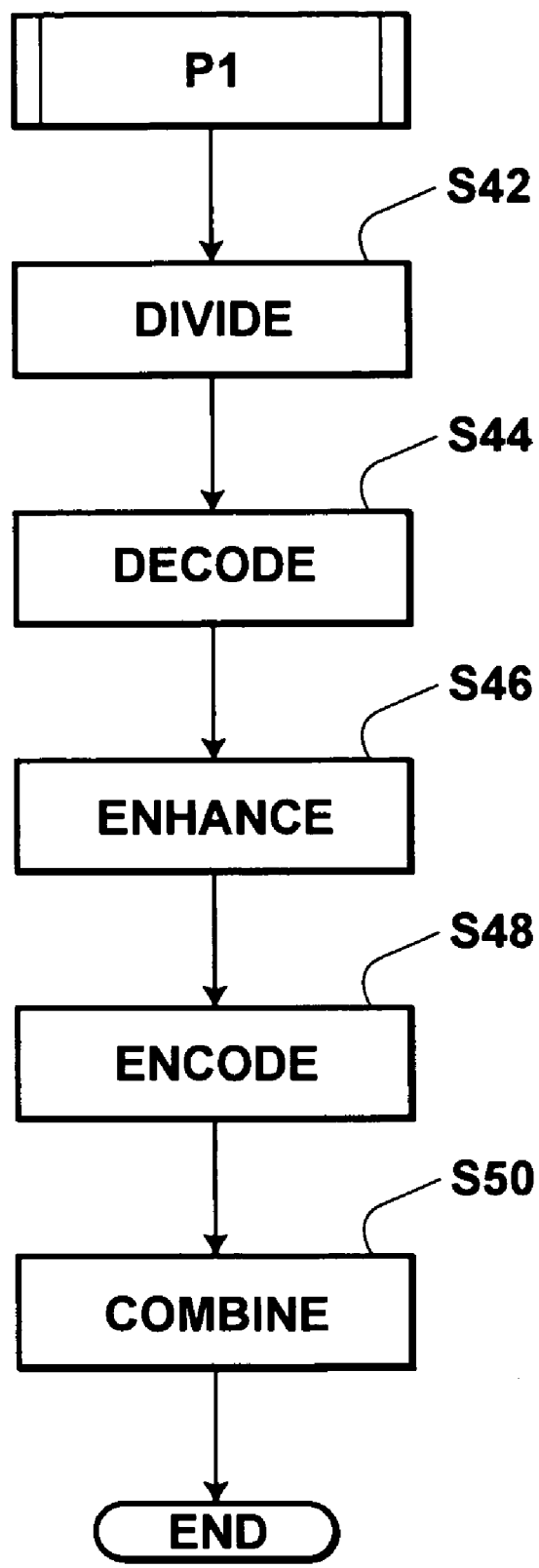
FIG. 4 is a flow chart showing the operation of a moving image processing unit 70 in the relay server 100.

FIG. 4 is a flow chart showing the operation of the moving image processing unit 70 in the relay server 100. In order to cause the moving image processing unit 70 to carry out the moving image enhancement processing P1 on the moving image G, the division unit 72 firstly divides the compressed moving image data G into the target data G0 and the non-target data G1 (Step S42). The decoding unit 74 decodes the target data G0, and obtains the decoded data G01 (Step S46). The correction unit 76 carries out the moving image enhancement processing P1 on the decoded data G01 to generate the corrected decoded data G02 (Step S46). The encoding unit 80 encodes the corrected decoded data G02, and obtains the encoded corrected data G03 (Step S48). The combination unit 82 then combines the encoded corrected data G03 with the non-target data G1 separated by the division unit 72, and obtains the corrected moving image G' (Step S50). The corrected moving image G' is sent to the control unit 40.

Figure 5:
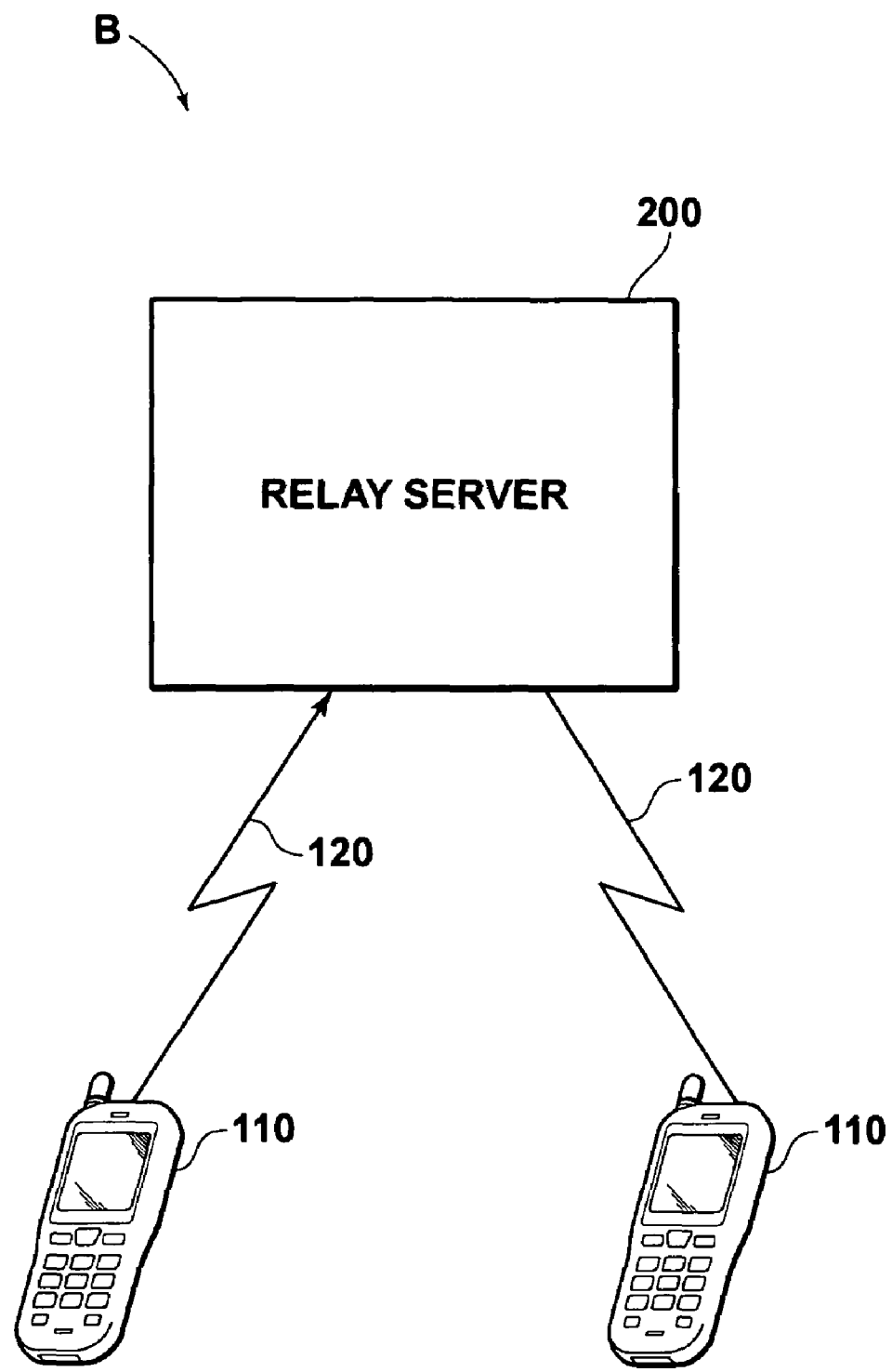
FIG. 5 is a block diagram showing a configuration of a mobile phone system B as a second embodiment of the image processing apparatus and the image processing program of the present invention.

FIG. 5 is a block diagram showing a configuration of a mobile phone system B as a second embodiment of the image processing apparatus and the program of the present invention. As shown in FIG. 5, the mobile phone system B in the second embodiment comprises a plurality of mobile phones 110 and a relay server 200 for relaying communication between the mobile phones 110. The mobile phones 110 are connected to the relay server 200 by a mobile phone communication network 120. The relay server 200 relays voice communication as well as e-mails between the mobile phones 110. For the sake of better understanding of the scope of the present invention, the operation of the relay server 200 will again be explained in detail in the case where an e-mail attached with image data is sent and received between two of the mobile phones 110.

Figure 6A:
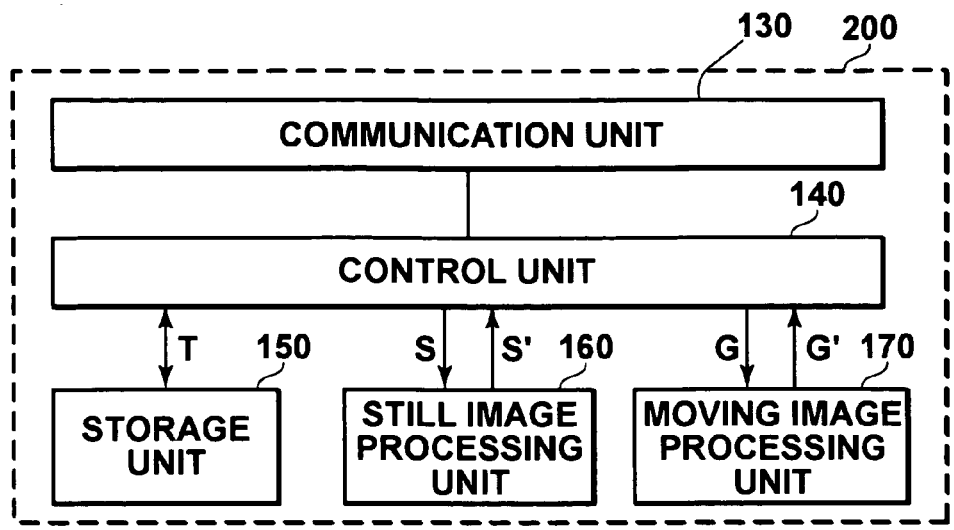
FIGS. 6A and 6B are block diagrams showing a configuration of a relay server 200 in the mobile phone system B shown in FIG. 5.
Figure 6B:
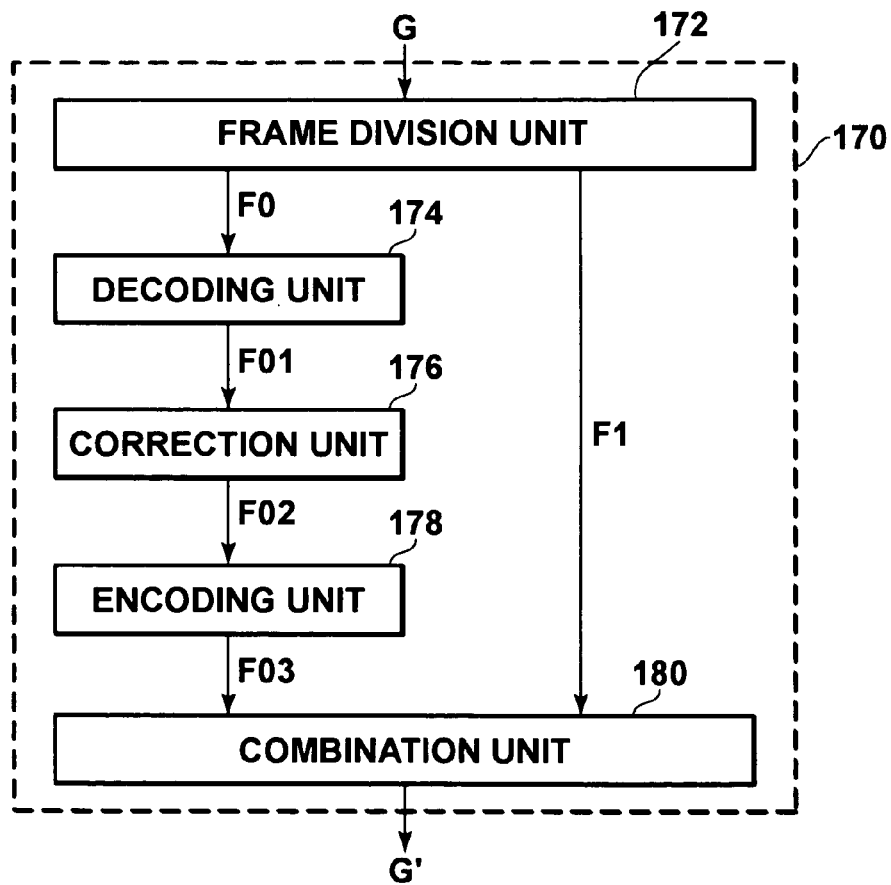

FIGS. 6A and 6B are block diagrams showing a configuration of the relay server 200 in the mobile phone system B shown in FIG. 5. As shown in FIG. 6A, the relay server 200 in the mobile phone system B comprises a communication unit 130, a control unit 140, a storage unit 150, a still image processing unit 160, and a moving image processing unit 170. The communication unit 130 carries out radio transmission and reception to and from the mobile phones 110. The control unit 140 controls the operation of the entire server 200 including the communication unit 130. The storage unit 150 stores data T excluding the image attached to the e-mail, under the control of the control unit 140. The still image processing unit 160 carries out image enhancement processing on a still image S attached to the e-mail, and obtains a corrected still image S'. The moving image processing unit 170 carries out image enhancement processing on a moving image G attached to the e-mail, and obtains a corrected moving image G'.

The still image S, the corrected still image S', the moving image G, and the corrected moving image G' are all compressed. The moving image G comprises a plurality of frames, and is compressed according to a method using a first frame as a reference frame.

The control unit 140 stores in the storage unit 150 the data T of the e-mail received from one of the two mobile phones 110 as a sender via the communication unit 130. As has been described above, the data T do not include the image attached to the e-mail. The control unit 140 also outputs the attached image to the still image processing unit 160 in the case where the attached image is the still image S. The control unit 140 then causes the still image processing unit 160 to carry out the image enhancement processing on the still image S, and obtains the corrected still image S'. In the case where the attached image is the moving image G, the control unit 140 outputs the attached image to the moving image processing unit 170, and causes the moving image processing unit 170 to carry out the image enhancement processing on the moving image G. In this manner, the corrected moving image G' is obtained. The control unit 140 attaches the corrected still image S' or the corrected moving image G' to the data T stored in the storage unit 150, and sends the e-mail attached with the corrected image to the other mobile phone 110 as a receiver via the communication unit 130.

FIG. 6B is a block diagram showing a configuration of the moving image processing unit 170 in the relay server 200 shown in FIG. 6A. As shown in FIG. 6B, the moving image processing unit 170 comprises a frame division unit 172, a decoding unit 174, a correction unit 176, an encoding unit 178, and a combination unit 180. The frame division unit 172 divides the compressed moving image data G into the first frame or frames (hereinafter referred to as first frames F0) and other frames F1. The decoding unit 174 obtains decoded first frames F01 by decoding the first frames F0. The correction unit 176 obtains corrected decoded first frames F02 by carrying out the image enhancement processing on the decoded first frames F01. The encoding unit 178 obtains corrected first frames F03 by encoding the corrected decoded first frames F02. The combination unit 180 obtains the corrected moving image data G' by combining the corrected first frames F03 with the other frames F1.

Figure 7:
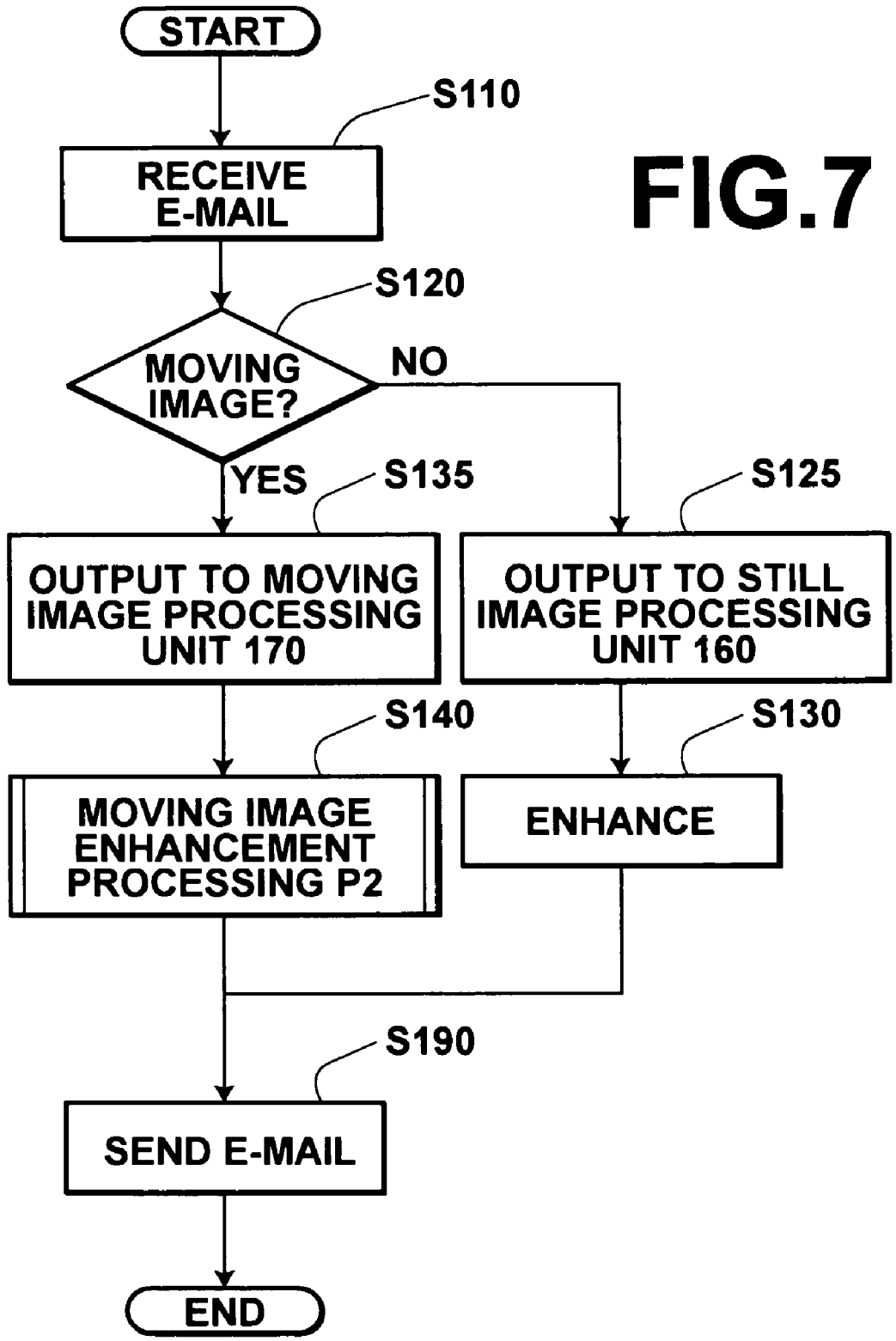
FIG. 7 is a flow chart showing the operation of the relay server 200 shown in FIG. 6.

FIG. 7 is a flow chart showing the operation of the relay server 200. When the relay server 200 receives via the communication unit 130 the e-mail sent from the sender mobile phone 110 with the image being attached thereto (Step S110), the control unit 140 judges whether the attached image is the still image S or the moving image G (Step S120). In the case where the attached image is the still image S (Step S120: NO), the control unit 140 stores the data T excluding the attached image in the storage unit 150, and outputs the still image S to the still image processing unit 160 (Step S125). The still image processing unit 160 carries out the image enhancement processing such as tone correction on the still image S, and obtains the corrected still image S' (Step S130). The control unit 140 attaches the corrected still image S' to the data T stored in the storage unit 150, and sends the e-mail attached with the corrected image to the receiver mobile phone 110 via the communication unit 130 (Step S190).

In the case where the attached image has been judged to be the moving image G at Step S120 (Step S120: YES), the control unit 140 stores the data T excluding the attached image in the storage unit 150, and outputs the moving image G to the moving image processing unit 170 (Step S135). The moving image processing unit 170 carries out the image enhancement processing such as tone correction (hereinafter referred to as moving image enhancement processing P2) on the moving image G, and obtains the corrected moving image G' (Step S140). The control unit 140 attaches the corrected moving image G' to the data T stored in the storage unit 150, and sends the e-mail attached with the corrected image to the receiver mobile phone 110 via the communication unit 130 (Step S190).

Figure 8:
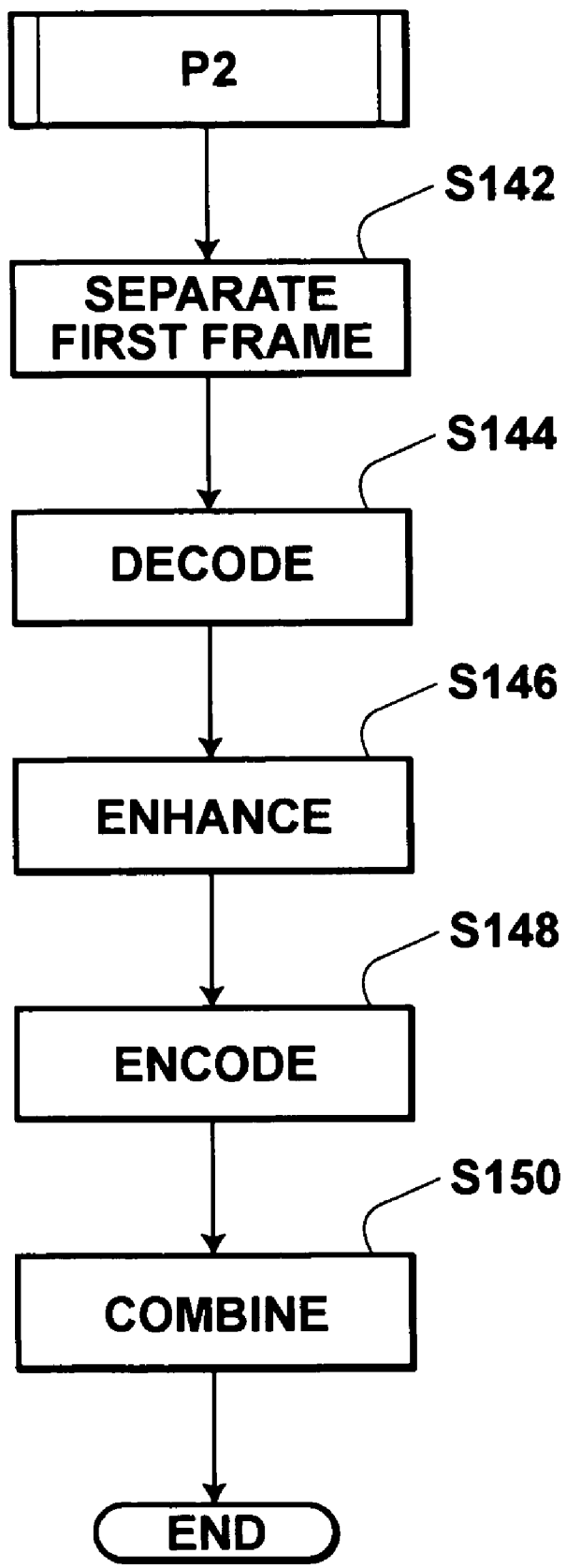
FIG. 8 is a flow chart showing the operation of a moving image processing unit 170 in the relay server 200.

FIG. 8 is a flow chart showing the operation of the moving image processing unit 170 in the relay server 200. When the moving image processing unit 170 carries out the moving image enhancement processing P2 on the moving image G, the frame division unit 172 firstly divides the compressed moving image data G into the first frames F0 and the other frames F1 (Step S142). The decoding unit 174 decodes the first frames F0, and obtains the decoded first frames F01 (Step S144). The correction unit 176 carries out the moving image enhancement processing P2 on the decoded first frames F01 to generate the corrected decoded first frames F02 (Step S146). The encoding unit 178 encodes the corrected decoded first frames F02, and obtains the corrected first frames F03 (Step S148). The combination unit 180 combines the corrected first frames F03 with the other frames F1 separated by the frame division unit 172, and obtains the corrected moving image G' (Step S150). The corrected moving image G' is sent to the control unit 140.

Figure 9:
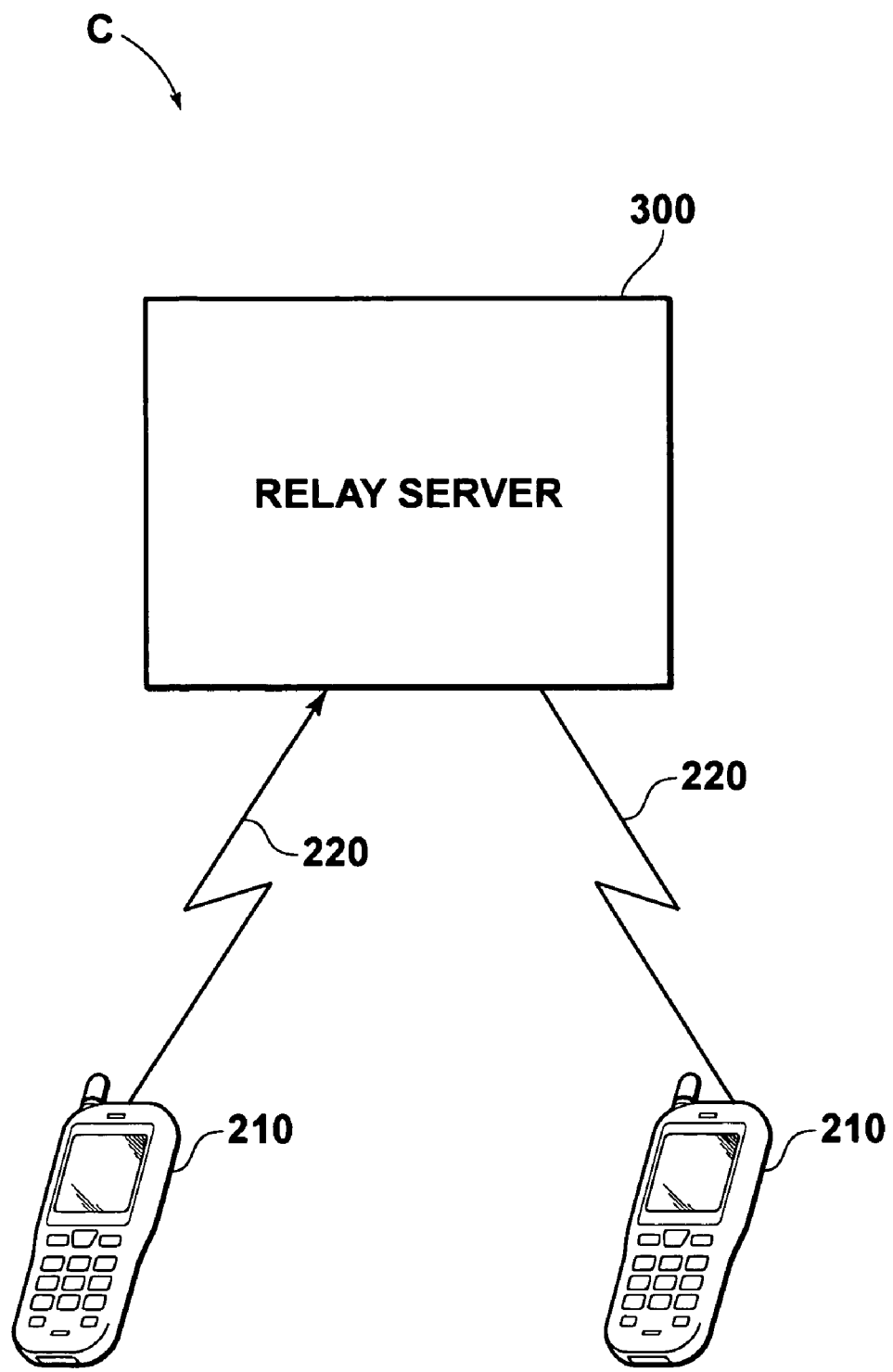
FIG. 9 is a block diagram showing a configuration of a mobile phone system C as a third embodiment of the image processing apparatus and the image processing program of the present invention.

FIG. 9 is a block diagram showing a configuration of a mobile phone system C as a third embodiment of the image processing apparatus and the program of the present invention. As shown in FIG. 9, the mobile phone system C in the third embodiment comprises a plurality of mobile phones 210 and a relay server 300 for relaying communication between the mobile phones 210. The mobile phones 210 are connected to the relay server 300 by a mobile phone communication network 220. The relay server 300 relays voice communication as well as e-mails between the mobile phones 210. For the sake of better understanding of the scope of the present invention, the operation of the relay server 300 will again be explained in detail in the case where an e-mail attached with image data is sent and received between two of the mobile phones 210.

Figure 10A:
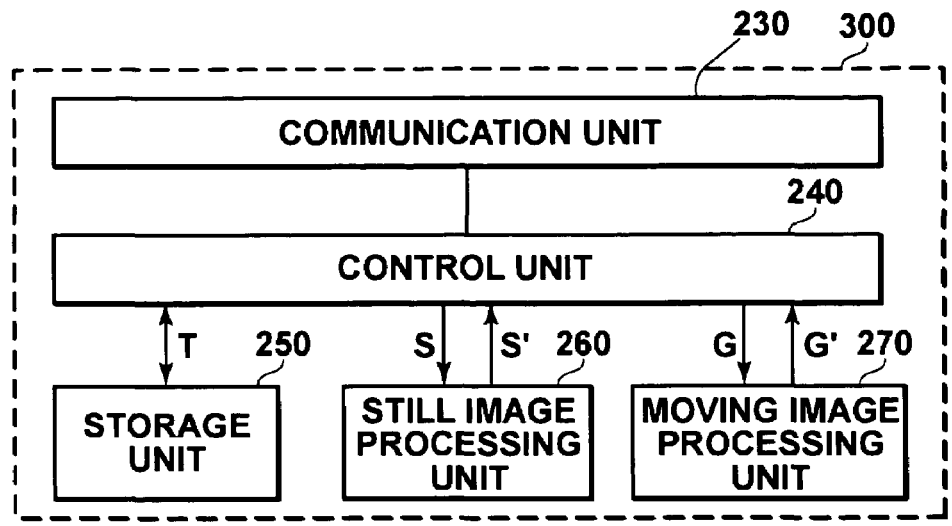
FIGS. 10A and 10B are block diagrams showing a configuration of a relay server 300 in the mobile phone system C shown in FIG. 9.
Figure 10B:
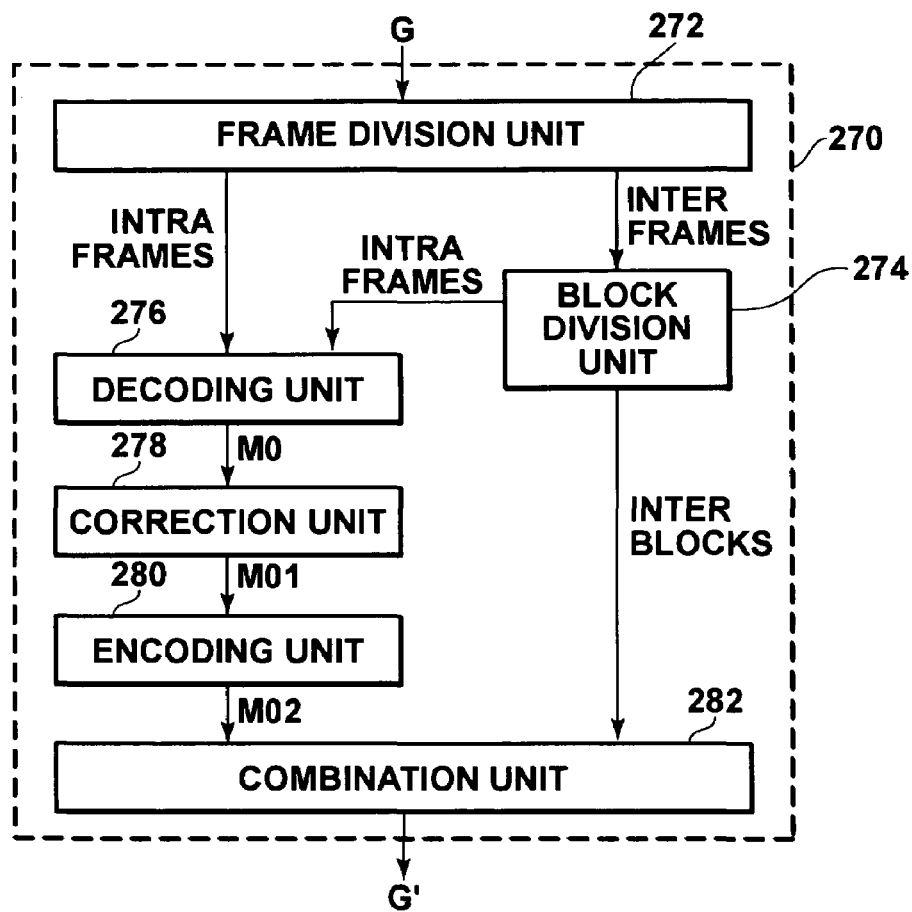

FIGS. 10A and 10B are block diagrams showing a configuration of the relay server 300 in the mobile phone system C shown in FIG. 9. As shown in FIG. 10A, the relay server 300 in the mobile phone system C comprises a communication unit 230, a control unit 240, a storage unit 250, a still image processing unit 260, and a moving image processing unit 270. The communication unit 230 carries out radio transmission and reception to and from the mobile phones 210. The control unit 240 controls the operation of the entire relay server 300 including the communication unit 230. The storage unit 250 stores data T excluding the image attached to the e-mail, under the control of the control unit 240. The still image processing unit 260 carries out image enhancement processing on a still image S attached to the e-mail, and obtains a corrected still image S'. The moving image processing unit 270 carries out image enhancement processing on a moving image G attached to the e-mail, and obtains a corrected moving image G'.

The still image S, the corrected still image S', the moving image G, and the corrected moving image G' are all compressed. The moving image G comprises intra frames and inter frames. The intra frames are independent. The inter frames comprise a difference between the frames and are not independent.

The control unit 240 stores in the storage unit 250 the data T of the e-mail received from one of the two mobile phones 210 as a sender via the communication unit 230. As has been described above, the data T do not include the image attached to the e-mail. The control unit 240 also outputs the attached image to the still image processing unit 260 in the case where the attached image is the still image S. The control unit 240 then causes the still image processing unit 260 to carry out the image enhancement processing on the still image S, and obtains the corrected still image S'. In the case where the attached image is the moving image G, the control unit 240 outputs the attached image to the moving image processing unit 270, and causes the moving image processing unit 270 to carry out the image enhancement processing on the moving image G. In this manner, the corrected moving image G' is obtained. The control unit 240 attaches the corrected still image S' or the corrected moving image G' to the data T stored in the storage unit 250, and sends the e-mail attached with the corrected image to the other mobile phone 210 as a receiver via the communication unit 230.

FIG. 10B is a block diagram showing a configuration of the moving image processing unit 270 in the relay server 300 shown in FIG. 10A. As shown in FIG. 10B, the moving image processing unit 270 comprises a frame division unit 272, a block division unit 274, a decoding unit 276, a correction unit 278, an encoding unit 280, and a combination unit 282. The frame division unit 272 divides the compressed moving image data G into the intra frames and the inter frames. The block division unit 274 further divides the inter frames into intra blocks and inter blocks. The decoding unit 276 obtains decoded intra frames and decoded intra blocks (hereinafter collectively referred to as decoded data M0) by decoding the intra frames and the intra blocks. The correction unit 278 obtains corrected decoded intra frames and corrected decoded intra blocks (hereinafter collectively referred to as corrected decoded data M01) by carrying out the image enhancement processing on the decoded data M0. The encoding unit 280 obtains corrected intra frames and corrected intra blocks (hereinafter collectively referred to as corrected data M02) by encoding the corrected decoded data M01. The combination unit 282 obtains the corrected moving image data G' by combining the corrected data M02 with the inter blocks.

FIG. 11 is a flow chart showing the operation of the relay server 300. When the relay server 300 receives via the communication unit 230 the e-mail sent from the sender mobile phone 210 with the image being attached thereto (Step S210), the control unit 240 judges whether the attached image is the still image S or the moving image G (Step S220). In the case where the attached image is the still image S (Step S220: NO), the control unit 240 stores the data T excluding the attached image in the storage unit 250, and outputs the still image S to the still image processing unit 260 (Step S225). The still image processing unit 260 carries out the image enhancement processing such as tone correction on the still image S, and obtains the corrected still image S' (Step S230). The control unit 240 attaches the corrected still image S' to the data T stored in the storage unit 250, and sends the e-mail attached with the corrected image to the receiver mobile phone 210 via the communication unit 230 (Step S290).

In the case where the attached image has been judged to be the moving image G at Step S220 (Step S220: YES), the control unit 240 stores the data T excluding the attached image in the storage unit 250, and outputs the moving image G to the moving image processing unit 270 (Step S235). The moving image processing unit 270 carries out the image enhancement processing such as tone correction (hereinafter referred to as moving image enhancement processing P3) on the moving image G, and obtains the corrected moving image G' (Step S240). The control unit 240 attaches the corrected moving image G' to the data T stored in the storage unit 250, and sends the e-mail attached with the corrected image to the receiver mobile phone 210 via the communication unit 230 (Step S290).

Figure 12:
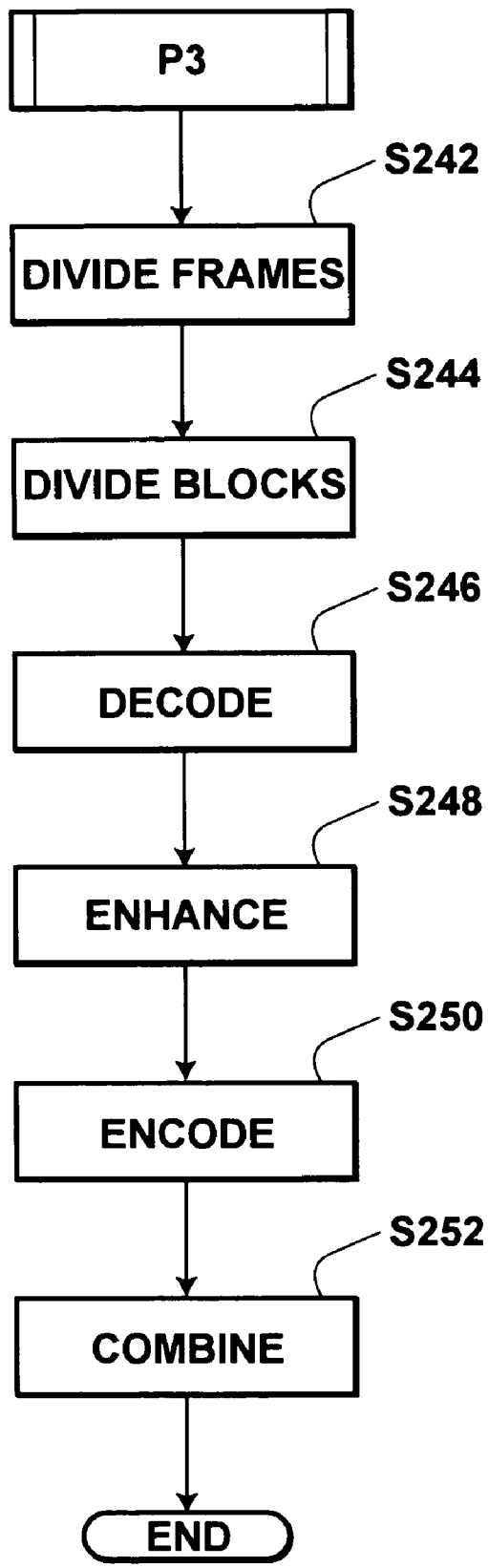
FIG. 12 is a flow chart showing the operation of a moving image processing unit 270 in the relay server 300.

FIG. 12 is a flow chart showing the operation of the moving image processing unit 270 in the relay server 300. When the moving image processing unit 270 carries out the moving image enhancement processing P3 on the moving image G, the frame division unit 272 firstly divides the compressed moving image data G into the intra frames and the inter frames (Step S242). The block division unit 274 further divides the inter frames into the intra blocks and the inter blocks (Step S244). The decoding unit 276 decodes the intra frames and the intra blocks, and obtains the decoded data M0 (Step S246). The correction unit 278 carries out the moving image enhancement processing P3 on the decoded data M0 to generate the corrected decoded data M01 (Step S248). The encoding unit 280 encodes the corrected decoded data M01, and obtains the corrected data M02 (Step S250). The combination unit 282 combines the corrected data M02 with the inter blocks, and obtains the corrected moving image G' (Step S252). The corrected moving image G' is sent to the control unit 240.

Figure 13:
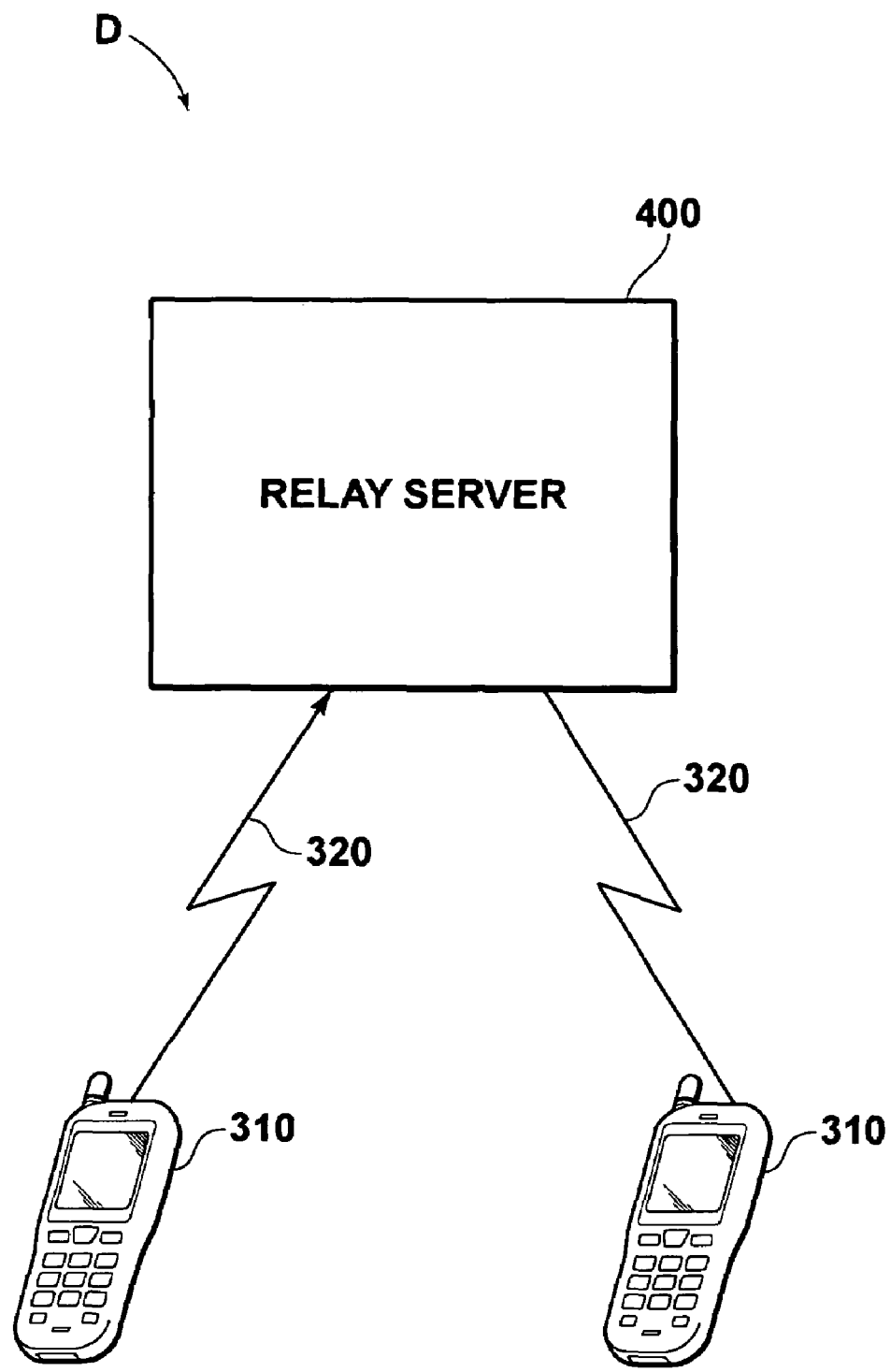
FIG. 13 is a block diagram showing a configuration of a mobile phone system D as a fourth embodiment of the image processing apparatus and the image processing program of the present invention.

FIG. 13 is a block diagram showing a configuration of a mobile phone system D as a fourth embodiment of the image processing apparatus and the program of the present invention. As shown in FIG. 13, the mobile phone system D in the fourth embodiment comprises a plurality of mobile phones 310 and a relay server 400 for relaying communication between the mobile phones 310. The mobile phones 310 are connected to the relay server 400 by a mobile phone communication network 320. The relay server 400 relays voice communication as well as e-mails between the mobile phones 310. For the sake of better understanding of the scope of the present invention, the operation of the relay server 400 will again be explained in detail in the case where an e-mail attached with image data is sent and received between two of the mobile phones 310.

Figure 14A:
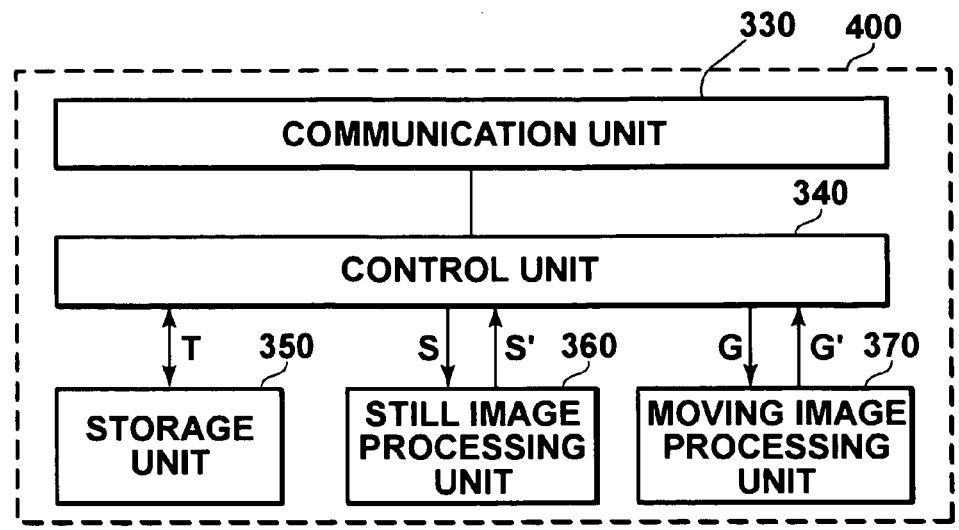
FIGS. 14A and 14B are block diagrams showing a configuration of a relay server 400 in the mobile phone system D shown in FIG. 13.
Figure 14B:
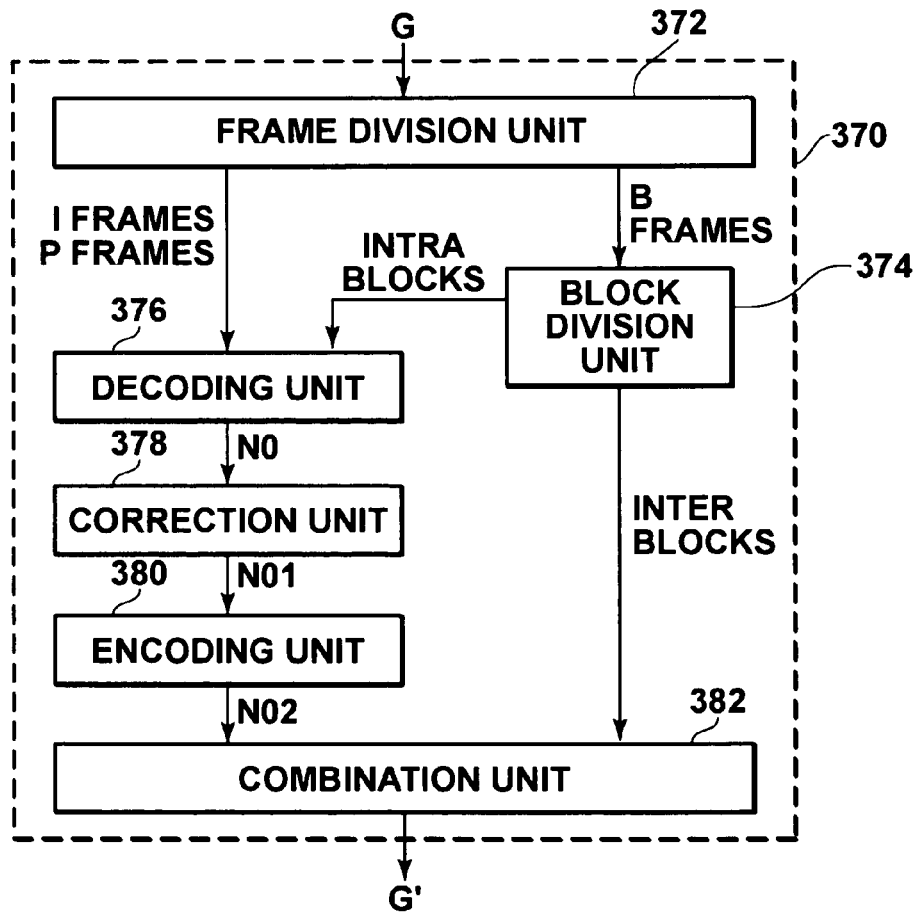

FIGS. 14A and 14B are block diagrams showing a configuration of the relay server 400 in the mobile phone system D shown in FIG. 13. As shown in FIG. 14A, the relay server 400 in the mobile phone system D comprises a communication unit 330, a control unit 340, a storage unit 350, a still image processing unit 360, and a moving image processing unit 370. The communication unit 330 carries out radio transmission and reception to and from the mobile phones 310. The control unit 340 controls the operation of the entire relay server 400 including the communication unit 330. The storage unit 350 stores data T excluding the image attached to the e-mail, under the control of the control unit 340. The still image processing unit 360 carries out image enhancement processing on a still image S attached to the e-mail, and obtains a corrected still image S'. The moving image processing unit 370 carries out image enhancement processing on a moving image G attached to the e-mail, and obtains a corrected moving image G'.

The still image S, the corrected still image S', the moving image G, and the corrected moving image G' are all compressed. The moving image G is compressed according to MPEG or the like, and comprises I frames, P frames, and B frames. The I frames are independent. Each of the P frames is dependent only on a preceding one of the frames. Each of the B frames is dependent on a preceding one of the frames and a subsequent one of the frames.

The control unit 340 stores in the storage unit 350 the data T of the e-mail received from one of the two mobile phones 310 as a sender via the communication unit 330. As has been described above, the data T do not include the image attached to the e-mail. The control unit 340 also outputs the attached image to the still image processing unit 360 in the case where the attached image is the still image S. The control unit 340 then causes the still image processing unit 360 to carry out the image enhancement processing on the still image S, and obtains the corrected still image S'. In the case where the attached image is the moving image G, the control unit 340 outputs the attached image to the moving image processing unit 370, and causes the moving image processing unit 370 to carry out the image enhancement processing on the moving image G. In this manner, the corrected moving image G' is obtained. The control unit 340 attaches the corrected still image S' or the corrected moving image G' to the data T stored in the storage unit 350, and sends the e-mail attached with the corrected image to the other mobile phone 310 as a receiver via the communication unit 330.

FIG. 14B is a block diagram showing a configuration of the moving image processing unit 370 in the relay server 400 shown in FIG. 14A. As shown in FIG. 14B, the moving image processing unit 370 comprises a frame division unit 372, a block division unit 374, a decoding unit 376, a correction unit 378, an encoding unit 380, and a combination unit 382. The frame division unit 372 divides the compressed moving image data G into the I frames, the P frames and the B frames. The block division unit 374 divides the B frames into intra blocks and inter blocks. The decoding unit 376 obtains decoded I frames, decoded P frames, and decoded intra blocks (hereinafter collectively referred to as decoded data N0) by decoding the I frames, the P frames and the intra blocks. The correction unit 378 obtains corrected decoded I frames, corrected decoded P frames, and corrected decoded intra blocks (hereinafter collectively referred to as corrected decoded data N01) by carrying out the image enhancement processing on the decoded data N0. The encoding unit 380 obtains corrected I frames, corrected P frames and corrected intra blocks (hereinafter collectively referred to as corrected data N02) by encoding the corrected decoded data N01. The combination unit 382 obtains the corrected moving image data G' by combining the corrected data N02 with the inter blocks. The encoding unit 380 has a reference frame memory that is not shown in FIG. 14B. When each of the corrected decoded P frames is encoded, the reference frame memory stores data of a preceding one of the corrected decoded I frames and/or a preceding one of the corrected decoded P frames used as reference therefor (that is, the frame or frames that the corresponding P frame is dependent on). The data stored in the reference frame memory are used for encoding the corresponding corrected decoded P frame.

Figure 15:
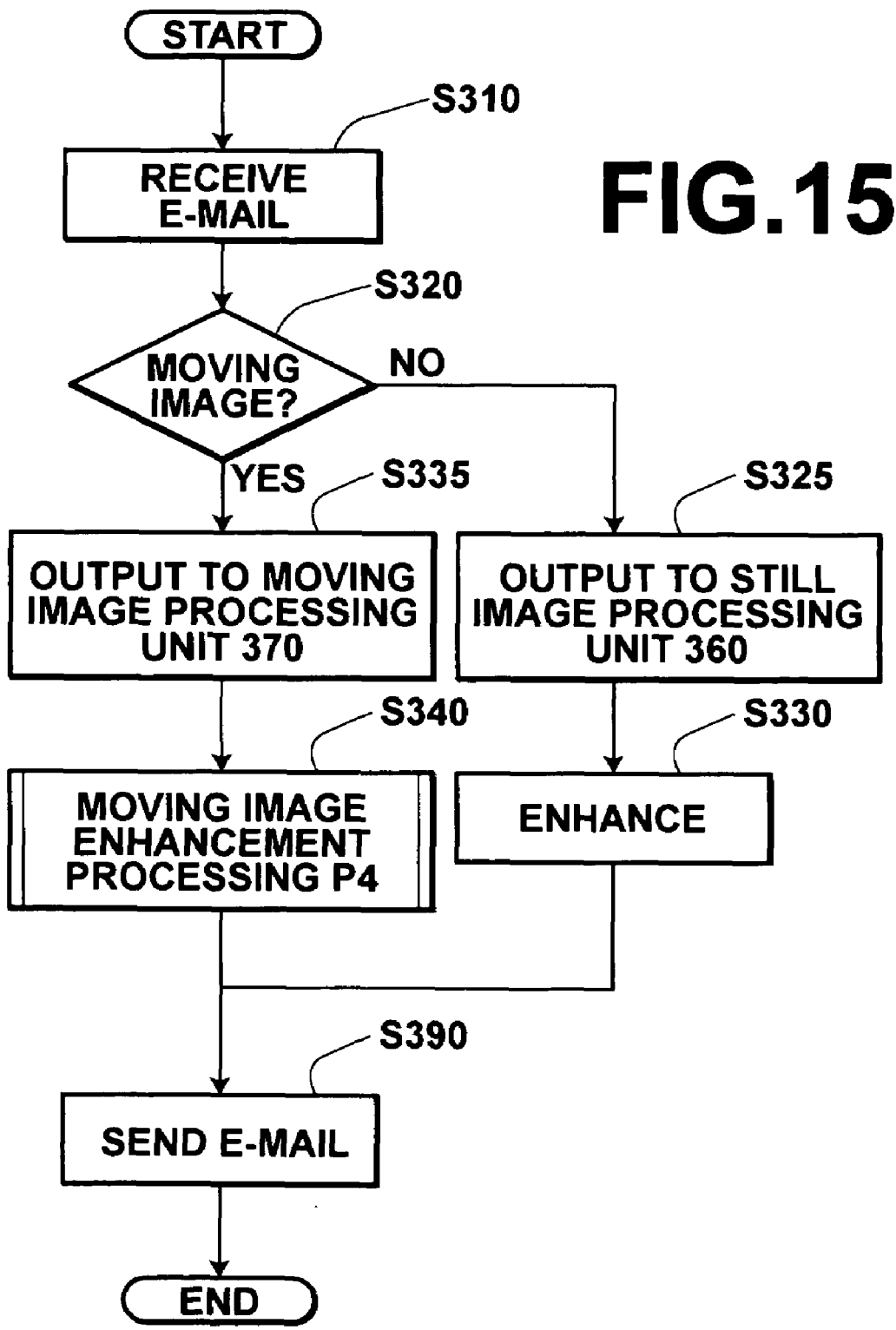
FIG. 15 is a flow chart showing the operation of the relay server 400 shown in FIG. 14.

FIG. 15 is a flow chart showing the operation of the relay server 400. When the relay server 400 receives via the communication unit 330 the e-mail sent from the sender mobile phone 310 with the image being attached thereto (Step S310), the control unit 340 judges whether the attached image is the still image S or the moving image G (Step S320). In the case where the attached image is the still image S (Step S320: NO), the control unit 340 stores the data T excluding the attached image in the storage unit 350, and outputs the still image S to the still image processing unit 360 (Step S325). The still image processing unit 360 carries out the image enhancement processing such as tone correction on the still image S, and obtains the corrected still image S' (Step S330). The control unit 340 attaches the corrected still image S' to the data T stored in the storage unit 350, and sends the e-mail attached with the corrected image to the receiver mobile phone 310 via the communication unit 330 (Step S390).

In the case where the attached image has been judged to be the moving image G at Step S320 (Step S320: YES), the control unit 340 stores the data T excluding the attached image in the storage unit 350, and outputs the moving image G to the moving image processing unit 370 (Step S335). The moving image processing unit 370 carries out the image enhancement processing such as tone correction (hereinafter referred to as moving image enhancement processing P4) on the moving image G, and obtains the corrected moving image G' (Step S340). The control unit 340 attaches the corrected moving image G' to the data T stored in the storage unit 350, and sends the e-mail attached with the corrected image to the receiver mobile phone 310 via the communication unit 330 (Step S390).

Figure 16:
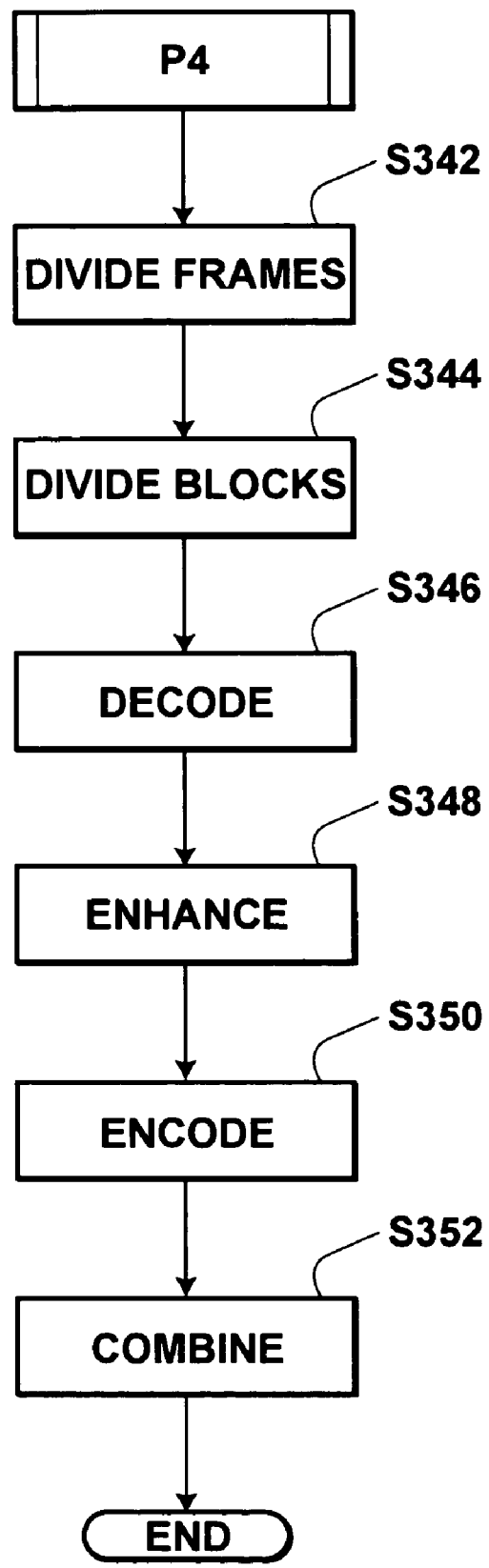
FIG. 16 is a flow chart showing the operation of a moving image processing unit 370 in the relay server 400.

FIG. 16 is a flow chart showing the operation of the moving image processing unit 370 in the relay server 400. When the moving image processing unit 370 carries out the moving image enhancement processing P4 on the moving image G, the frame division unit 372 firstly divides the compressed moving image data G into the I frames, the P frames and the B frames (Step S342). The block division unit 374 further divides the B frames into the intra blocks and the inter blocks (Step S344). The decoding unit 376 decodes the I frames, the P frames and the intra blocks, and obtains the decoded data N0 (Step S346). The correction unit 378 carries out the moving image enhancement processing P4 on the decoded data N0 to generate the corrected decoded data N01 (Step S348). The encoding unit 380 encodes the corrected decoded data N01, and obtains the corrected data N02 (Step S350). The combination unit 382 combines the corrected data N02 with the inter blocks, and obtains the corrected moving image G' (Step S352). The corrected moving image G' is sent to the control unit 340.

Figure 17:
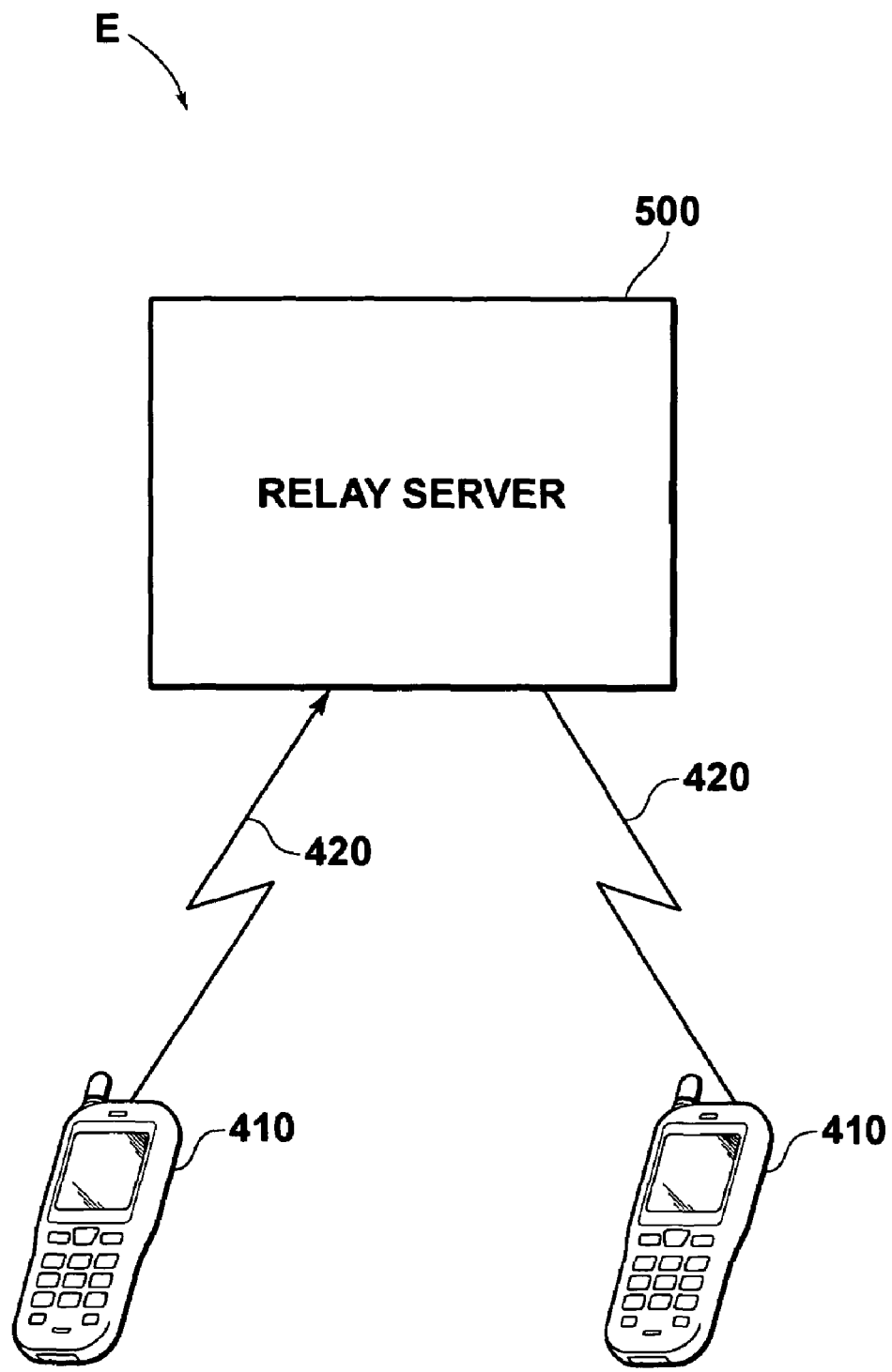
FIG. 17 is a block diagram showing a configuration of a mobile phone system E as a fifth embodiment of the image processing apparatus and the image processing program of the present invention.

FIG. 17 is a block diagram showing a configuration of a mobile phone system E as a fifth embodiment of the image processing apparatus and the program of the present invention. As shown in FIG. 15, the mobile phone system E in the fifth embodiment comprises a plurality of mobile phones 410 and a relay server 500 for relaying communication between the mobile phones 410. The mobile phones 410 are connected to the relay server 500 by a mobile phone communication network 420. The relay server 500 relays voice communication as well as e-mails between the mobile phones 410. For the sake of better understanding of the scope of the present invention, the operation of the relay server 500 will again be explained in detail in the case where an e-mail attached with image data is sent and received between two of the mobile phones 410.

Figure 18A:
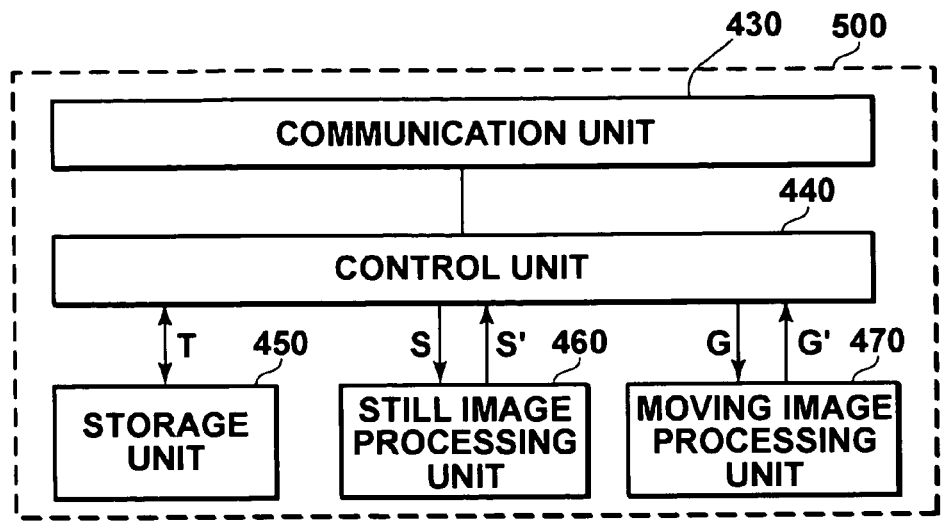
FIGS. 18A and 18B are block diagrams showing a configuration of a relay server 500 in the mobile phone system E shown in FIG. 17.
Figure 18B:
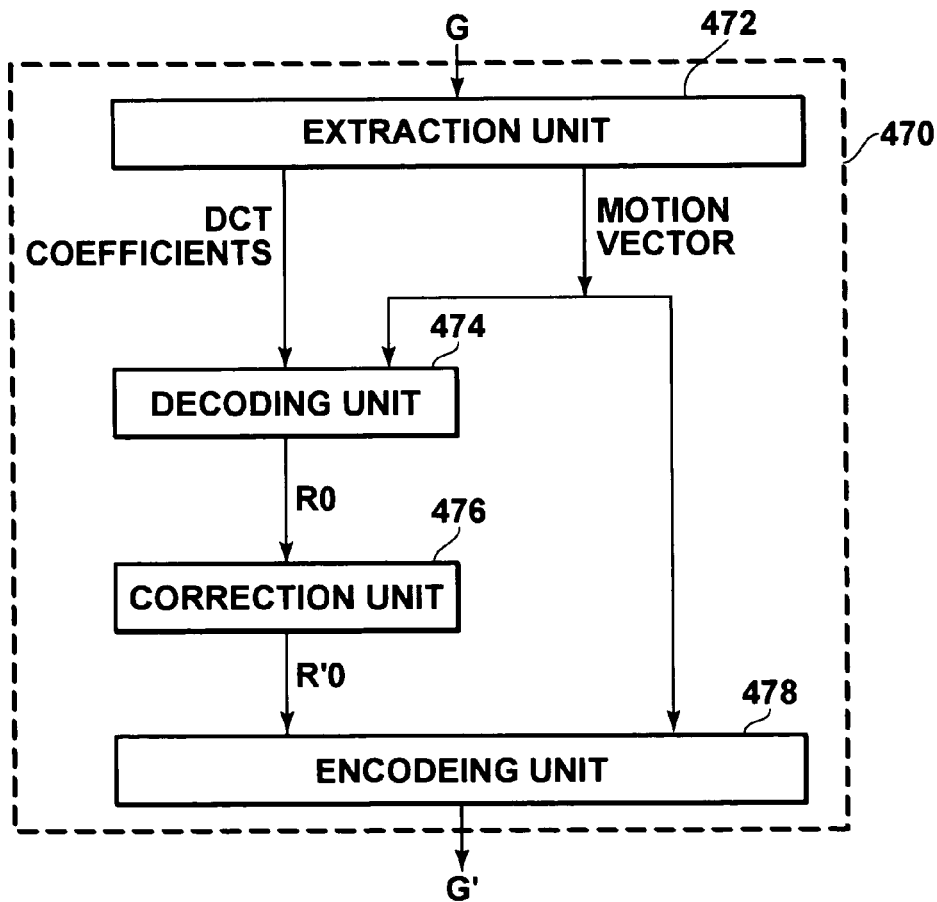

FIGS. 18A and 18B are block diagrams showing a configuration of the relay server 500 in the mobile phone system E shown in FIG. 17. As shown in FIG. 18A, the relay server 500 in the mobile phone system E comprises a communication unit 430, a control unit 440, a storage unit 450, a still image processing unit 460, and a moving image processing unit 470. The communication unit 430 carries out radio transmission and reception to and from the mobile phones 410. The control unit 440 controls the operation of the entire relay server 500 including the communication unit 430. The storage unit 450 stores data T excluding the image attached to the e-mail, under the control of the control unit 440. The still image processing unit 460 carries out image enhancement processing on a still image S attached to the e-mail, and obtains a corrected still image S'. The moving image processing unit 470 carries out image enhancement processing on a moving image G attached to the e-mail, and obtains a corrected moving image G'.

The still image S, the corrected still image S', the moving image G, and the corrected moving image G' are all compressed. The moving image G has been compressed according to MPEG or the like, and comprises header information and frames. Each of the frames mainly comprises DCT coefficient data and motion vector data.

The control unit 440 stores in the storage unit 450 the data T of the e-mail received from one of the two mobile phones 410 as a sender via the communication unit 430. As has been described above, the data T do not include the image attached to the e-mail. The control unit 440 also outputs the attached image to the still image processing unit 460, in the case where the attached image is the still image S. The control unit 440 then causes the still image processing unit 460 to carry out the image enhancement processing on the still image S, and obtains the corrected still image S'. In the case where the attached image is the moving image G, the control unit 440 outputs the attached image to the moving image processing unit 470, and causes the moving image processing unit 470 to carry out the image enhancement processing on the moving image G. In this manner, the corrected moving image G' is obtained. The control unit 440 attaches the corrected still image S' or the corrected moving image G' to the data T stored in the storage unit 450, and sends the e-mail attached with the processed image to the other mobile phone 410 as a receiver via the communication unit 430.

FIG. 18B is a block diagram showing a configuration of the moving image processing unit 470 in the relay server 500 shown in FIG. 18A. As shown in FIG. 18B, the moving image processing unit 470 comprises an extraction unit 472, a decoding unit 474, a correction unit 476, and an encoding unit 478. The extraction unit 472 extracts the DCT coefficient data and the motion vector data from the compressed moving image data G. The decoding unit 474 obtains decoded data R0 by decoding the compressed moving image data G while using the DCT coefficient data and the motion vector data. The correction unit 476 obtains corrected decoded data R'0 by carrying out the image enhancement processing on the decoded data R0. The encoding unit 478 obtains the corrected moving image G' by encoding the corrected decoded data R'0 with use of the motion vector data. The encoding unit 478 has a reference frame memory that is not shown in FIG. 18B. When each of the frames is encoded, the reference frame memory stores the corrected decoded data R'0 of the frame or frames that the corresponding frame to be encoded is dependent on. The data stored in the reference memory are used as reference for encoding the corresponding frame.

Figure 19:
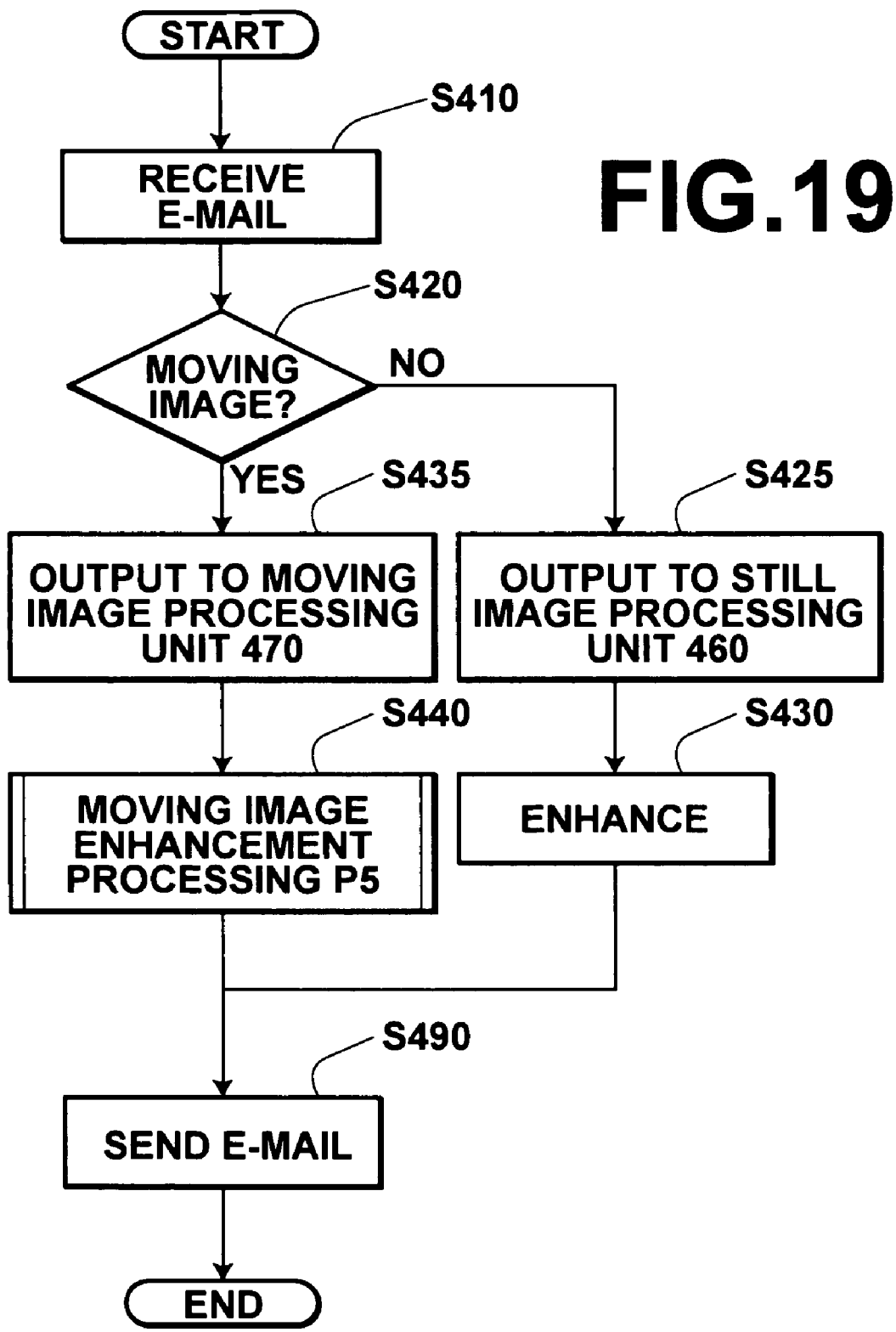
FIG. 19 is a flow chart showing the operation of the relay server 500 shown in FIG. 18.

FIG. 19 is a flow chart showing the operation of the relay server 500. When the relay server 500 receives via the communication unit 430 the e-mail sent from the sender mobile phone 410 with the image being attached thereto (Step S410), the control unit 440 judges whether the attached image is the still image S or the moving image G (Step S420). In the case where the attached image is the still image S (Step S420: NO), the control unit 440 stores the data T excluding the attached image in the storage unit 450, and outputs the still image S to the still image processing unit 460 (Step S425). The still image processing unit 460 carries out the image enhancement processing such as tone correction on the still image S, and obtains the corrected still image S' (Step S430). The control unit 440 attaches the corrected still image S' to the data T stored in the storage unit 450, and sends the e-mail attached with the corrected image to the receiver mobile phone 410 via the communication unit 430 (Step S490).

In the case where the attached image has been judged to be the moving image G at Step S420 (Step S420: YES), the control unit 440 stores the data T excluding the attached image in the storage unit 450, and outputs the moving image G to the moving image processing unit 470 (Step S435). The moving image processing unit 470 carries out the image enhancement processing such as tone correction (hereinafter referred to as moving image enhancement processing P5) on the moving image G, and obtains the corrected moving image G' (Step S440). The control unit 440 attaches the corrected moving image G' to the data T stored in the storage unit 450, and sends the e-mail attached with the corrected image to the receiver mobile phone 410 via the communication unit 430 (Step S490).

Figure 20:
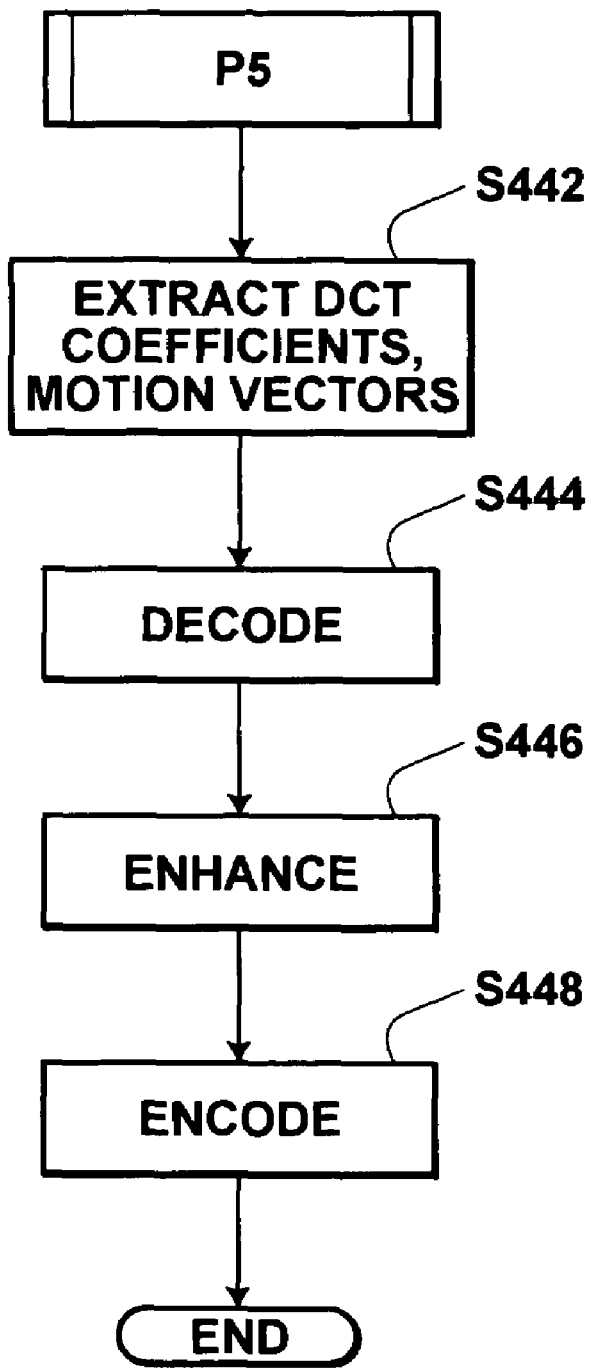
FIG. 20 is a flow chart showing the operation of a moving image processing unit 470 in the relay server 500.

FIG. 20 is a flow chart showing the operation of the moving image processing unit 270 in the relay server 500. In order to cause the moving image processing unit 470 to carry out the moving image enhancement processing P5 on the moving image G, the extraction unit 472 firstly extracts the DCT coefficient data and the motion vector data from the compressed moving image data G (Step S442). The decoding unit 474 decodes each of the frames with use of the DCT coefficient data and the motion vector data, and obtains the decoded data R0 (Step S444). The correction unit 476 carries out the moving image enhancement processing P5 on the decoded data R0 to generate the corrected decoded data R'0 (Step S446). The encoding unit 478 encodes the corrected decoded data R'0 with use of the motion vector data of each of the frames, and obtains the corrected moving image data G' (Step S448). The corrected moving image G' is sent to the control unit 440.

In the mobile phone systems A to D as the first to fourth embodiment of the present invention described above, the compressed moving image data are firstly divided into the part to be corrected and the part not to be corrected by the image enhancement processing such as tone correction. The decoding processing, the image enhancement processing, and the encoding processing are then carried out only on the part to be corrected, and the processed compressed moving image data are obtained after combination with the part not to be corrected. Therefore, the image enhancement processing can be carried out for appropriate display of the processed compressed moving image data, and the time necessary for generating the processed data can be shortened efficiently by reducing the amount of the data to be decoded and encoded.

The mobile phone system E as the fifth embodiment of the present invention uses the fact that motion vectors rarely affect an image quality such as tones when image enhancement processing is carried out on compressed moving image data generated according MPEG or the like and comprising frames that mainly have DCT coefficient data and motion vector data. Therefore, when the compressed moving image data are encoded after being decoded and subjected to the image enhancement processing, the encoding processing is carried out by using the motion vector data extracted from the compressed moving image data at the time of decoding. In this manner, operations for finding motion vector data are not necessary at the time of encoding after the image enhancement processing, which results in shorter processing time. Therefore, the processed compressed moving image data can be obtained efficiently through the image enhancement processing.

Figure 21:
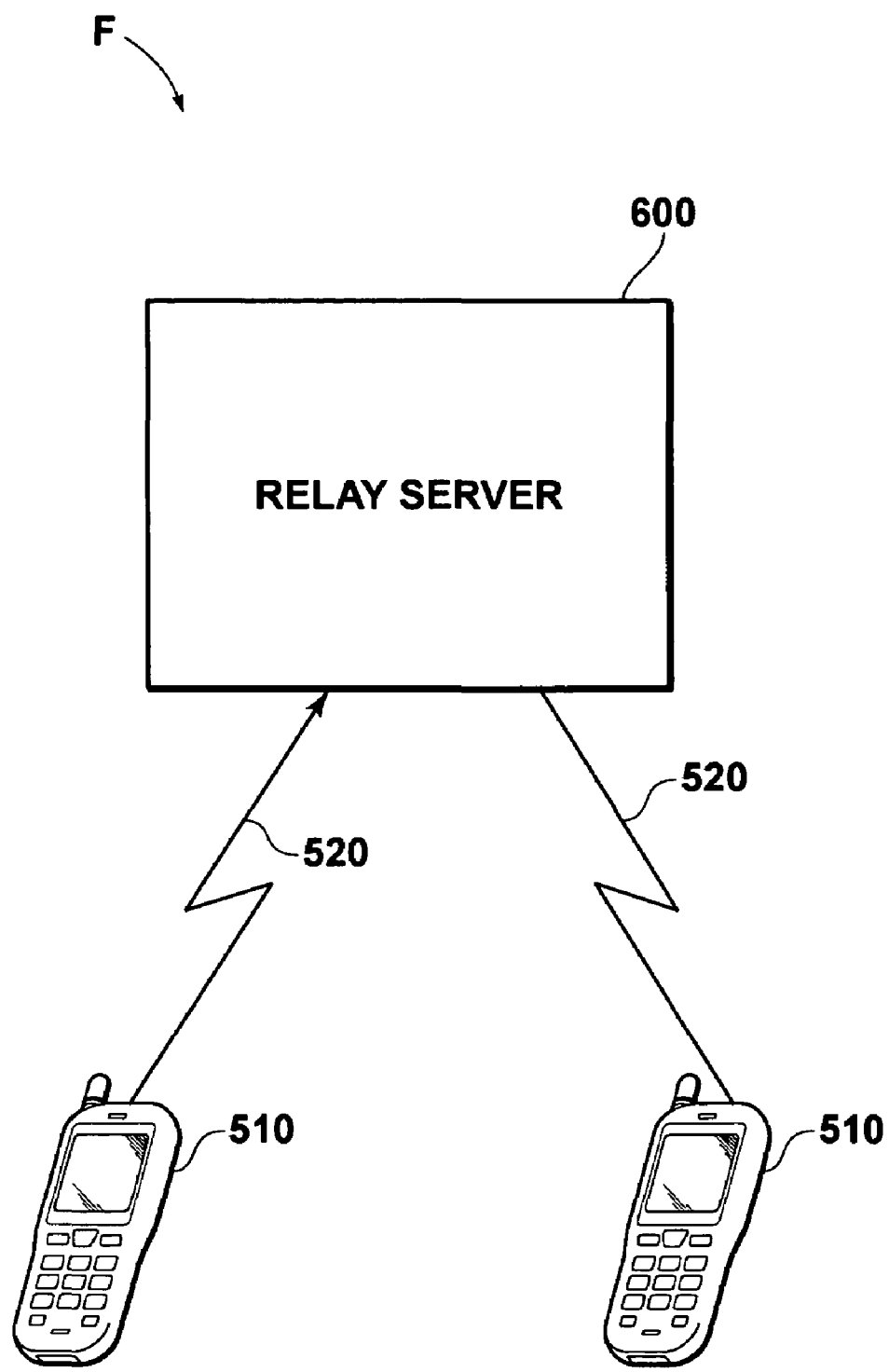
FIG. 21 is a block diagram showing a configuration of a mobile phone system F as a sixth embodiment of the image processing apparatus and the image processing program of the present invention.

FIG. 21 is a block diagram showing a configuration of a mobile phone system F as a sixth embodiment of the image processing apparatus and the program of the present invention. As shown in FIG. 21, the mobile phone system F in the fifth embodiment comprises a plurality of mobile phones 510 and a relay server 600 for relaying communication between the mobile phones 510. The mobile phones 510 are connected to the relay server 600 by a mobile phone communication network 520. The relay server 600 relays voice communication as well as e-mails between the mobile phones 510. For the sake of better understanding of the scope of the present invention, the operation of the relay server 600 will again be explained in detail in the case where an e-mail attached with image data is sent and received between two of the mobile phones 510.

Figure 22A:
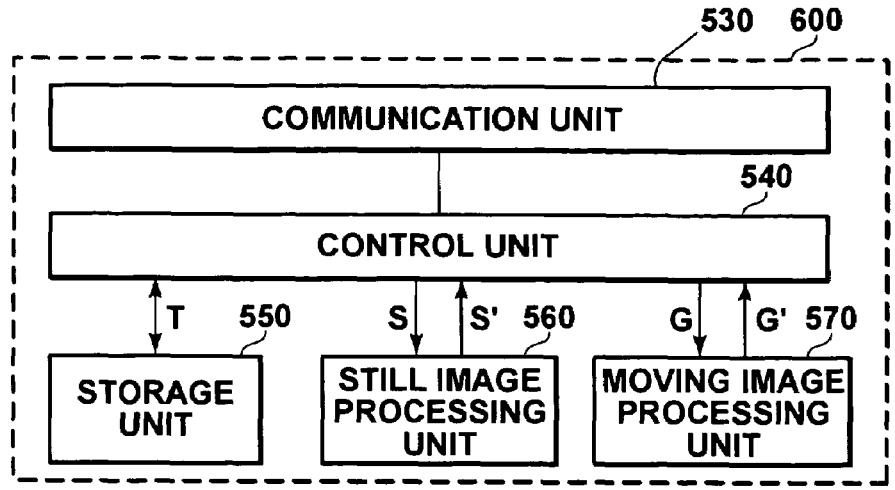
FIGS. 22A and 22B are block diagrams showing a configuration of a relay server 600 in the mobile phone system F shown in FIG. 21.
Figure 22B:
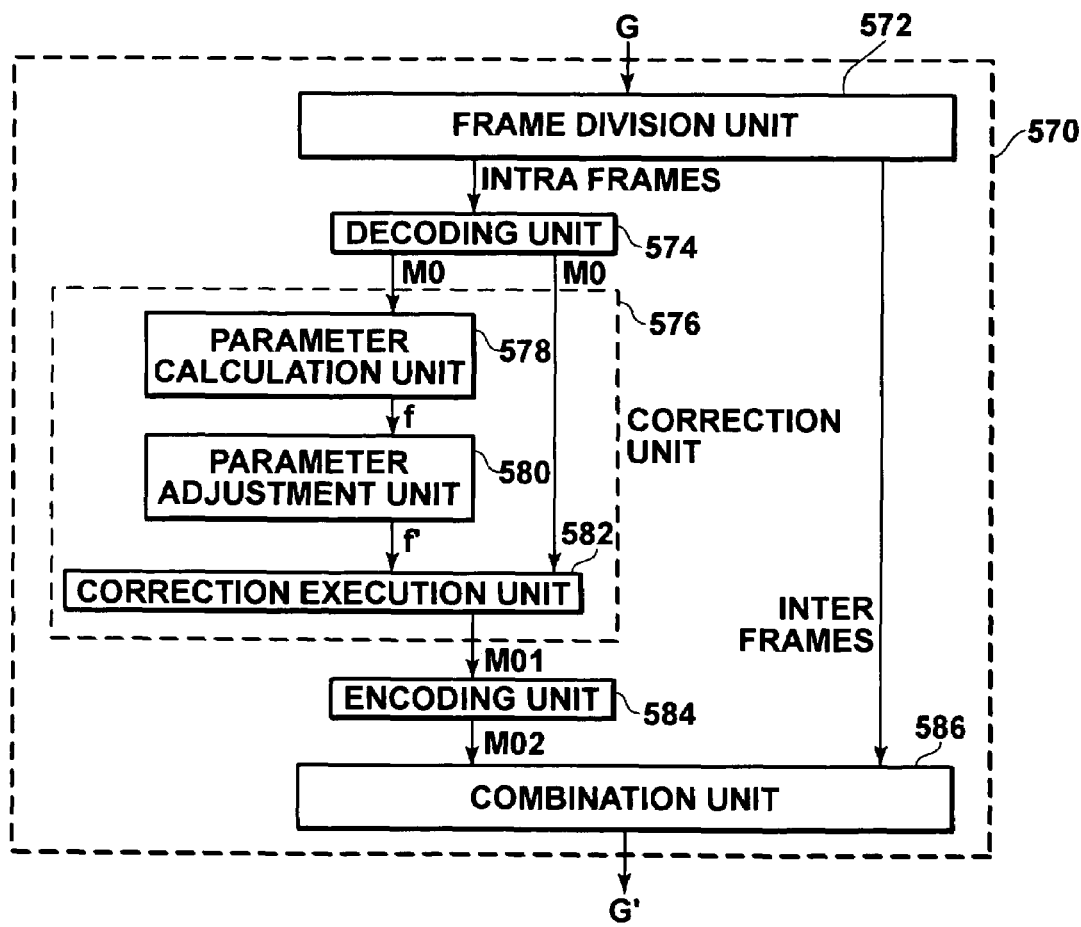

FIGS. 22A and 22B are block diagrams showing a configuration of the relay server 600 in the mobile phone system F shown in FIG. 21. As shown in FIG. 22A, the relay server 600 in the mobile phone system F comprises a communication unit 530, a control unit 540, a storage unit 550, a still image processing unit 560, and a moving image processing unit 570. The communication unit 530 carries out radio transmission and reception to and from the mobile phones 510. The control unit 540 controls the operation of the entire relay server 600 including the communication unit 530. The storage unit 550 stores data T excluding the image attached to the e-mail, under the control of the control unit 540. The still image processing unit 560 carries out image enhancement processing on a still image S attached to the e-mail, and obtains a corrected still image S'. The moving image processing unit 570 carries out image enhancement processing on a moving image G attached to the e-mail, and obtains a corrected moving image G'.

The still image S, the corrected still image S', the moving image G, and the corrected moving image G' are all compressed. The moving image G comprises intra frames and inter frames. The intra frames are independent. The inter frames comprise a difference between the frames and are not independent.

The control unit 540 stores in the storage unit 550 the data T of the e-mail received from one of the two mobile phones 510 as a sender via the communication unit 530. As has been described above, the data T do not include the image attached to the e-mail. The control unit 540 also outputs the attached image to the still image processing unit 560 in the case where the attached image is the still image S. The control unit 540 then causes the still image processing unit 560 to carry out the image enhancement processing on the still image S, and obtains the corrected still image S'. In the case where the attached image is the moving image G, the control unit 540 outputs the attached image to the moving image processing unit 570, and causes the moving image processing unit 570 to carry out the image enhancement processing on the moving image G. In this manner, the corrected moving image G' is obtained. The control unit 540 attaches the corrected still image S' or the corrected moving image G' to the data T stored in the storage unit 550, and sends the e-mail attached with the corrected image to the other mobile phone 510 as a receiver via the communication unit 530.

FIG. 22B is a block diagram showing a configuration of the moving image processing unit 570 in the relay server 600 shown in FIG. 22A. As shown in FIG. 22B, the moving image processing unit 570 comprises a frame division unit 572, a decoding unit 574, a correction unit 576, an encoding unit 584, and a combination unit 586. The frame division unit 572 divides the compressed moving image data G into the intra frames and the inter frames. The decoding unit 574 obtains decoded intra frames M0 by decoding the intra frames. The correction unit 576 obtains corrected decoded intra frames M01 by carrying out the image enhancement processing on the decoded intra frames M0. The encoding unit 584 obtains corrected intra frames M02 by encoding the corrected decoded intra frames M01. The combination unit 586 obtains the corrected moving image data G' by combining the corrected intra frames M02 with the inter frames.

The correction unit 576 in the moving image processing unit 570 carries out the image enhancement processing on the decoded intra frames M0, and comprises a parameter calculation unit 578, a parameter adjustment unit 580, and a correction execution unit 582. The parameter calculation unit 578 calculates a correction parameter f for each of the decoded intra frames M0 to be corrected, by using the data of the corresponding decoded intra frame M0. The parameter adjustment unit 580 averages the correction parameter f of the corresponding decoded intra frame M0 and two of the decoded intra frames M0 that sandwich the corresponding decoded intra frame M0. The parameter adjustment unit 580 uses the average as an adjusted parameter f' for the corresponding decoded intra frame M0. The correction execution unit 582 carries out the image enhancement processing on each of the decoded intra frames M0 by using the adjusted parameter f' therefor, and obtains the corrected decoded intra frames M01.

Figure 23:
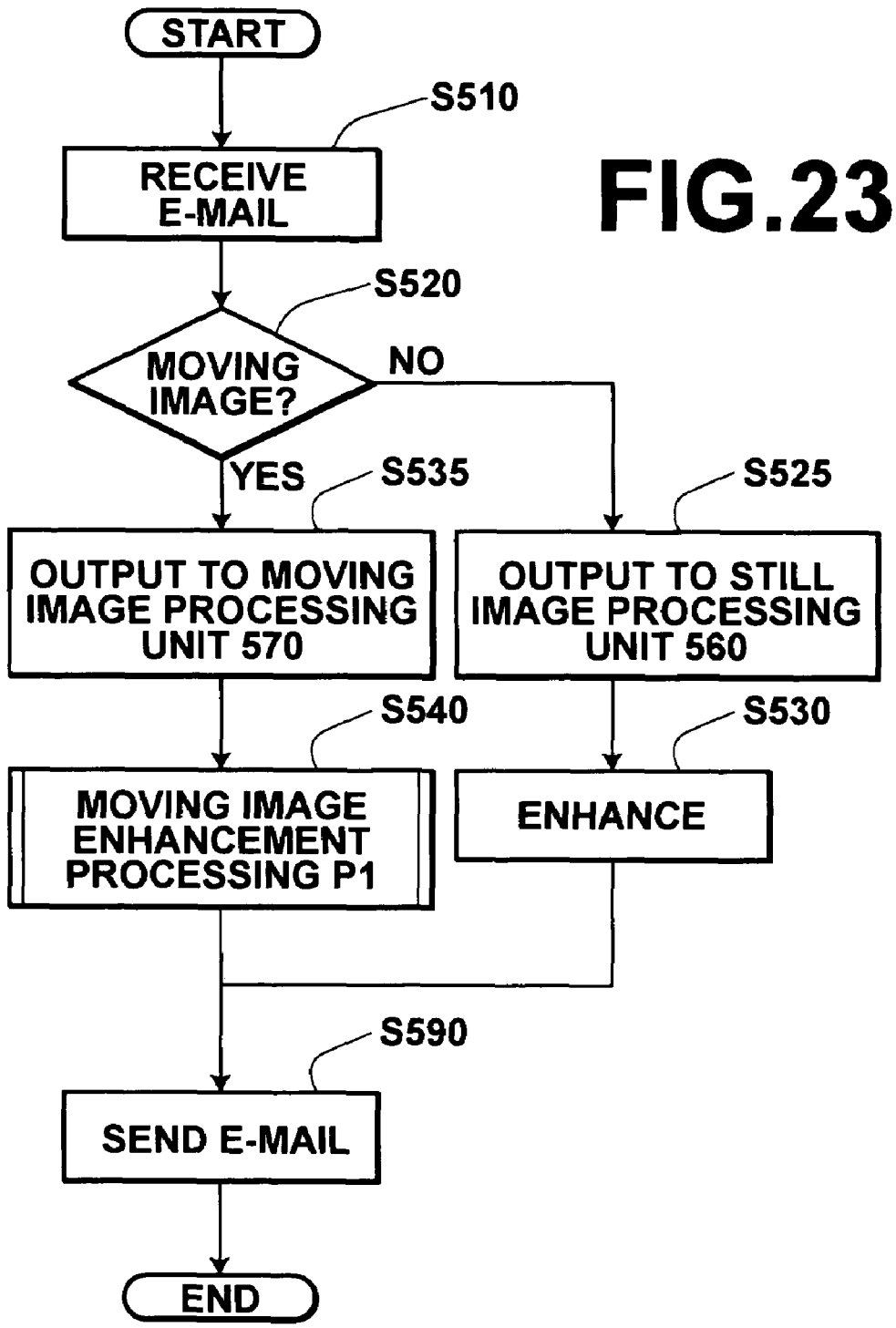
FIG. 23 is a flow chart showing the operation of the relay server 600 shown in FIG. 22.

FIG. 23 is a flow chart showing the operation of the relay server 600. When the relay server 600 receives via the communication unit 530 the e-mail sent from the sender mobile phone 510 with the image being attached thereto (Step S510), the control unit 540 judges whether the attached image is the still image S or the moving image G (Step S520). In the case where the attached image is the still image S (Step S520: NO), the control unit 540 stores the data T excluding the attached image in the storage unit 550, and outputs the still image S to the still image processing unit 560 (Step S525). The still image processing unit 560 carries out the image enhancement processing such as tone correction on the still image S, and obtains the corrected still image S' (Step S530). The control unit 540 attaches the corrected still image S' to the data T stored in the storage unit 550, and sends the e-mail attached with the corrected image to the receiver mobile phone 510 via the communication unit 530 (Step S590).

In the case where the attached image has been judged to be the moving image G at Step S520 (Step S520: YES), the control unit 540 stores the data T excluding the attached image in the storage unit 550, and outputs the moving image G to the moving image processing unit 570 (Step S535). The moving image processing unit 570 carries out the image enhancement processing such as tone correction (hereinafter referred to as moving image enhancement processing P1) on the moving image G, and obtains the corrected moving image G' (Step S540). The control unit 540 attaches the corrected moving image G' to the data T stored in the storage unit 550, and sends the e-mail attached with the corrected image to the receiver mobile phone 510 via the communication unit 530 (Step S590).

Figure 24:
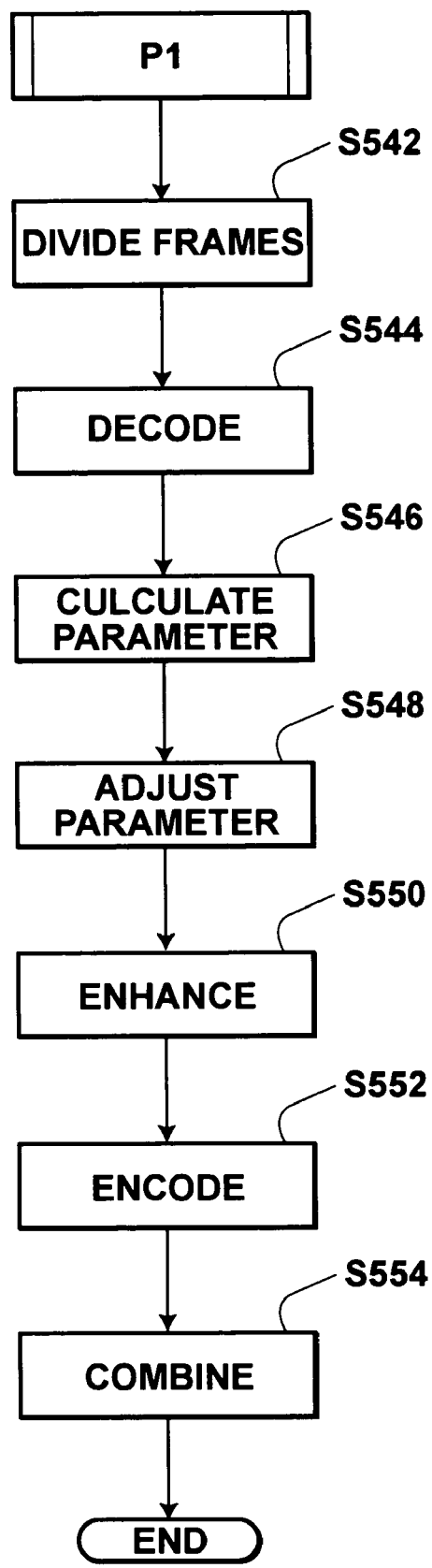
FIG. 24 is a flow chart showing the operation of a moving image processing unit 570 in the relay server 600.

FIG. 24 is a flow chart showing the operation of the moving image processing unit 570 in the relay server 600. When the moving image processing unit 570 carries out the moving image enhancement processing P1 on the moving image G, the frame division unit 572 firstly divides the compressed moving image data G into the intra frames and the inter frames (Step S542). The decoding unit 574 decodes the intra frames, and obtains the decoded intra frames M0 (Step S544). The parameter calculation unit 578 in the correction unit 576 calculates the correction parameter f for each of the decoded intra frames M0 by using the data thereof, and outputs the correction parameter f to the parameter adjustment unit 580 (Step S546). The parameter adjustment unit 580 averages the correction parameter f of the corresponding decoded intra frame M0 and the two sandwiching decoded intra frames M0, and outputs the average as the adjusted parameter f' to the correction execution unit 582 (Step S548). The correction execution unit 582 then carries out the moving image enhancement processing P1 on each of the decoded intra frames M0 by using the adjusted parameter f' therefor, and obtains the corrected decoded intra frames M01 (Step S550). The encoding unit 584 encodes the corrected decoded intra frames M01, and obtains the corrected intra frames M02 to be output to the combination unit 586 (Step S552). The combination unit 586 combines the corrected intra frames M02 with the inter frames, and obtains the corrected moving image G' (Step S554). The corrected moving image G' is sent to the control unit 540.

As has been described above, according to the mobile phone system F in the sixth embodiment of the present invention, the moving image processing unit 570 in the relay server 600 firstly divides the compressed moving image data G into the intra frames and the inter frames for carrying out the moving image enhancement processing. Only the intra frames are subjected to the decoding processing, the moving image enhancement processing, and the encoding processing, and the corrected intra frames M02 are obtained. The corrected intra frames are then combined with the inter frames to generate the processed compressed moving image data G'. At this time, the moving image enhancement processing is carried out on each of the decoded intra frames by using the average of the correction parameter that is found for the corresponding decoded intra frame and the two sandwiching decoded intra frames with use of the data thereof. In this manner, an amount of data to be encoded and decoded can be reduced for shorter processing time, and the adjustment of the correction parameter can prevent a change in lightness of the processed compressed moving image at the time of display thereof.

Figure 25:
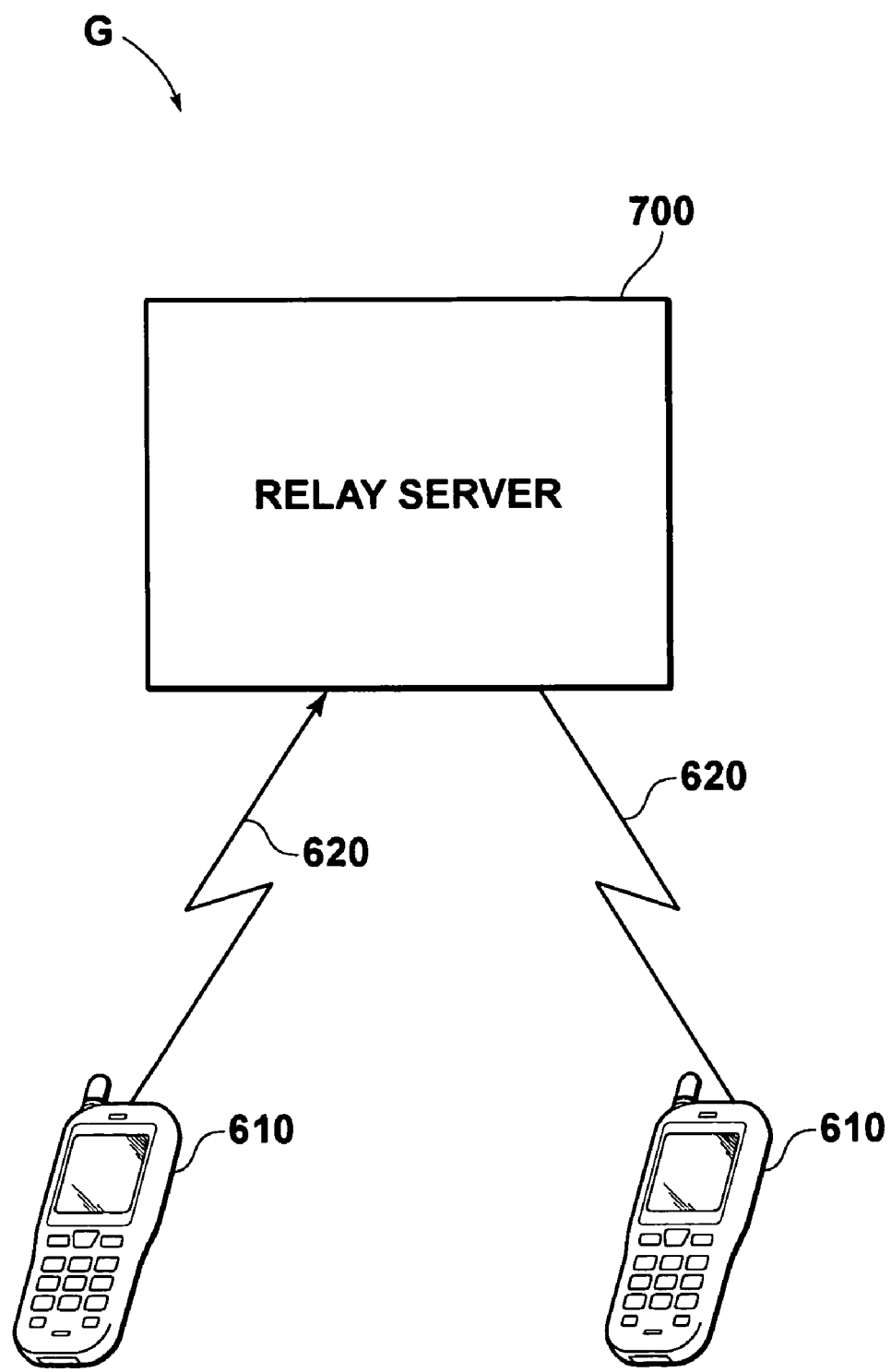
FIG. 25 is a block diagram showing a configuration of a mobile phone system G as a seventh embodiment of the image processing apparatus and the image processing program of the present invention.

FIG. 25 is a block diagram showing a configuration of a mobile phone system G as a seventh embodiment of the image processing apparatus and the program of the present invention. As shown in FIG. 25, the mobile phone system G in the seventh embodiment comprises a plurality of mobile phones 610 and a relay server 700 for relaying communication between the mobile phones 610. The mobile phones 610 are connected to the relay server 700 by a mobile phone communication network 620. The relay server 700 relays voice communication as well as e-mails between the mobile phones 610. For the sake of better understanding of the scope of the present invention, the operation of the relay server 700 will again be explained in detail in the case where an e-mail attached with image data is sent and received between two of the mobile phones 610.

Figure 26A:
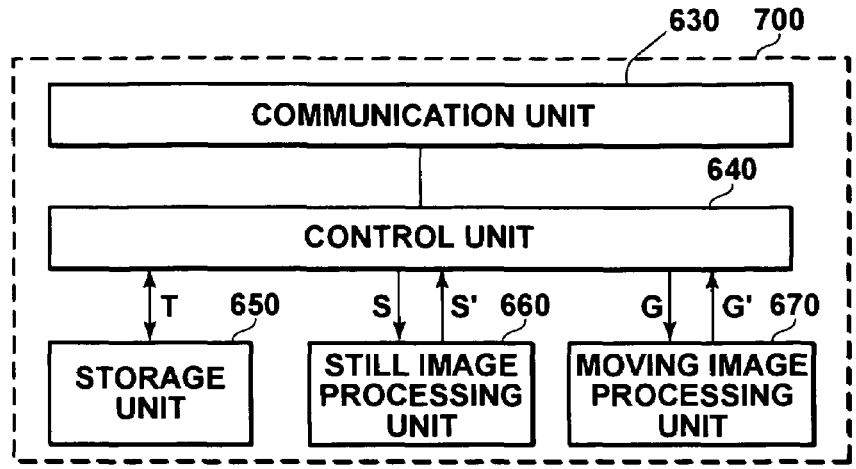
FIGS. 26A and 26B are block diagrams showing a configuration of a relay server 700 in the mobile phone system G shown in FIG. 25.
Figure 26B:
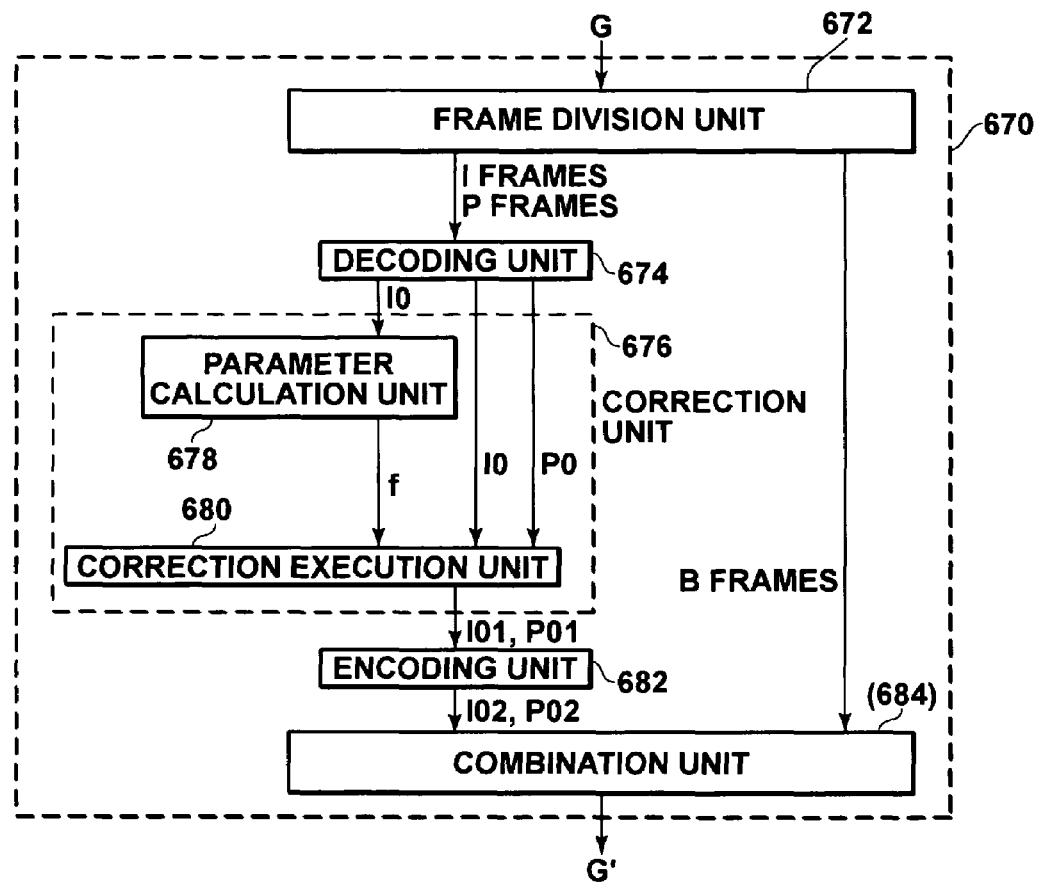

FIGS. 26A and 26B are block diagrams showing a configuration of the relay server 700 in the mobile phone system G shown in FIG. 25. As shown in FIG. 26A, the relay server 700 in the mobile phone system G comprises a communication unit 630, a control unit 640, a storage unit 650, a still image processing unit 660, and a moving image processing unit 670. The communication unit 630 carries out radio transmission and reception to and from the mobile phones 610. The control unit 640 controls the operation of the entire relay server 700 including the communication unit 630. The storage unit 650 stores data T excluding the image attached to the e-mail, under the control of the control unit 640. The still image processing unit 660 carries out image enhancement processing on a still image S attached to the e-mail, and obtains a corrected still image S'. The moving image processing unit 670 carries out image enhancement processing on a moving image G attached to the e-mail, and obtains a corrected moving image G'.

The still image S, the corrected still image S', the moving image G, and the corrected moving image G' are all compressed. The moving image G is compressed according to MPEG or the like, and comprises I frames, P frames, and B frames. The I frames are independent. Each of the P frames is dependent only on a preceding one of the frames while each of the B frames is dependent on a preceding one of the frames and a subsequent one of the frames.

The control unit 640 stores in the storage unit 650 the data T of the e-mail received from one of the two mobile phones 610 as a sender via the communication unit 630. As has been described above, the data T do not include the image attached to the e-mail. The control unit 640 also outputs the attached image to the still image processing unit 660 in the case where the attached image is the still image S. The control unit 640 then causes the still image processing unit 660 to carry out the image enhancement processing on the still image S, and obtains the corrected still image S'. In the case where the attached image is the moving image G, the control unit 640 outputs the attached image to the moving image processing unit 670, and causes the moving image processing unit 670 to carry out the image enhancement processing on the moving image G. In this manner, the corrected moving image G' is obtained. The control unit 640 attaches the corrected still image S' or the corrected moving image G' to the data T stored in the storage unit 650, and sends the e-mail attached with the corrected image to the other mobile phone 610 as a receiver via the communication unit 630.

FIG. 26B is a block diagram showing a configuration of the moving image processing unit 670 in the relay server 700 shown in FIG. 26A. As shown in FIG. 26B, the moving image processing unit 670 comprises a frame division unit 672, a decoding unit 674, a correction unit 676, an encoding unit 682, and a combination unit 684. The frame division unit 672 divides the compressed moving image data G into the I frames, the P frames and the B frames. The decoding unit 674 obtains decoded I frames I0 and decoded P frames P0 by decoding the I frames and the P frames. The correction unit 676 obtains corrected decoded I frames I01 and corrected decoded P frames P01 by carrying out the image enhancement processing on the decoded I frames I0 and the decoded P frames P0. The encoding unit 682 obtains corrected I frames I02 and corrected P frames P02 by encoding the corrected decoded I frames I01 and the corrected decoded P frames P01. The combination unit 684 obtains the corrected moving image data G' by combining the corrected I frames I02 and the corrected P frames P02 with the B frames. The correction unit 676 comprises a parameter calculation unit 678 and a correction execution unit 680. The parameter calculation unit 678 calculates a correction parameter f for each of the decoded I frames I0 by using the data thereof. The correction execution unit 680 carries out the image enhancement processing on each of the decoded I frames I0 by using the correction parameter f therefor, and obtains the corrected decoded I frames I01. The correction execution unit 680 also carries out the image enhancement processing on each of the decoded P frames P0 that is sandwiched between one of the decoded I frames I0 and the immediately following decoded I frame I0, by using the correction parameter f of the former decoded I frame I0. In this manner, the corrected decoded P frames P01 are obtained.

FIG. 27 is a flow chart showing the operation of the relay server 700. When the relay server 700 receives via the communication unit 630 the e-mail sent from the sender mobile phone 610 with the image being attached thereto (Step S610), the control unit 640 judges whether the attached image is the still image S or the moving image G (Step S620). In the case where the attached image is the still image S (Step S620: NO), the control unit 640 stores the data T excluding the attached image in the storage unit 650, and outputs the still image S to the still image processing unit 660 (Step S625). The still image processing unit 660 carries out the image enhancement processing such as tone correction on the still image S, and obtains the corrected still image S' (Step S630). The control unit 640 attaches the corrected still image S' to the data T stored in the storage unit 650, and sends the e-mail attached with the corrected image to the receiver mobile phone 610 via the communication unit 630 (Step S690).

In the case where the attached image has been judged to be the moving image G at Step S620 (Step S620: YES), the control unit 640 stores the data T excluding the attached image in the storage unit 650, and outputs the moving image G to the moving image processing unit 670 (Step S635). The moving image processing unit 670 carries out the image enhancement processing such as tone correction (hereinafter referred to as moving image enhancement processing P2) on the moving image G, and obtains the corrected moving image G' (Step S640). The control unit 640 attaches the corrected moving image G' to the data T stored in the storage unit 650, and sends the e-mail attached with the corrected image to the receiver mobile phone 610 via the communication unit 630 (Step S690).

Figure 28:
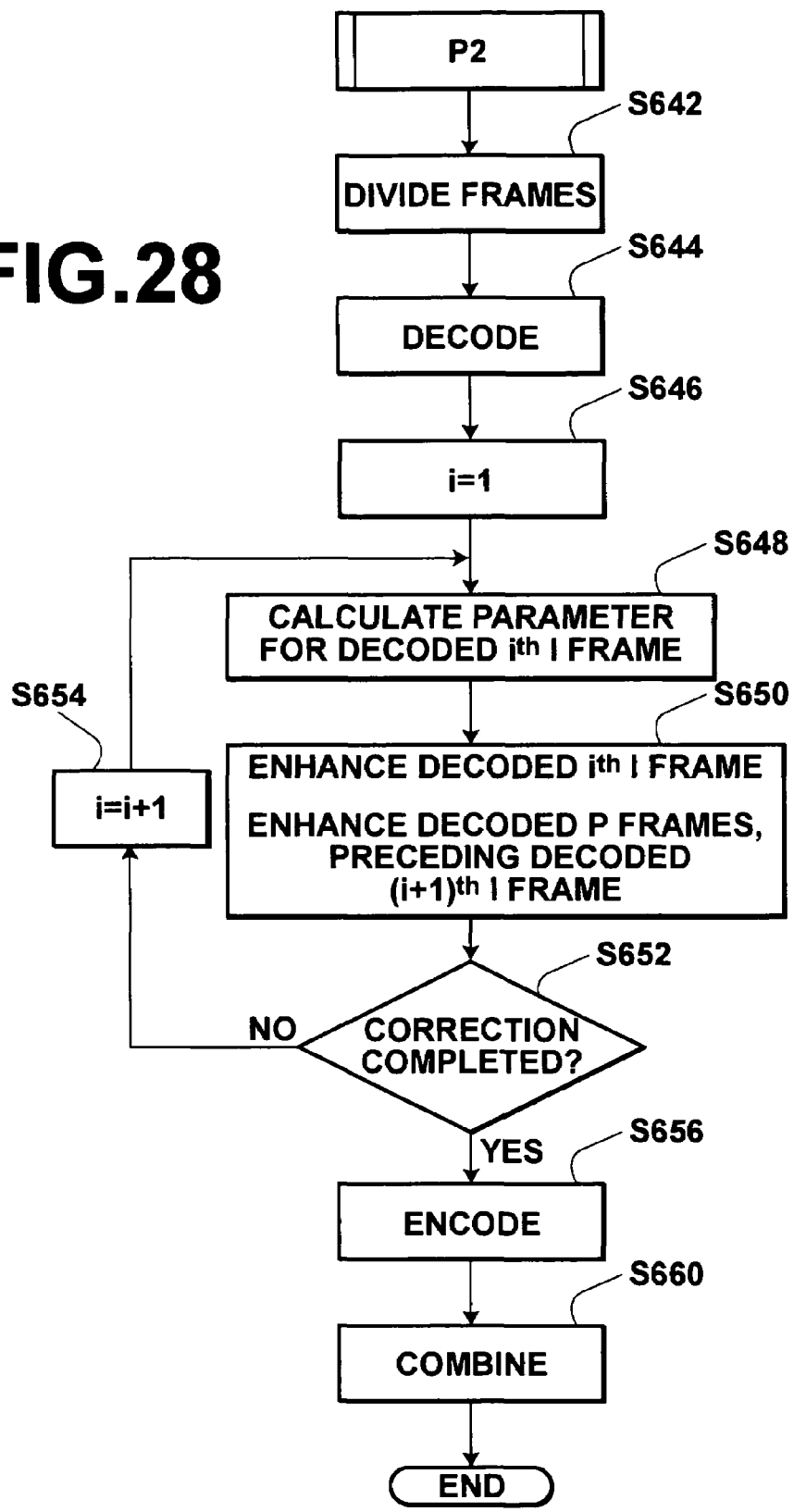
FIG. 28 is a flow chart showing the operation of a moving image processing unit 670 in the relay server 700.

FIG. 28 is a flow chart showing the operation of the moving image processing unit 670 in the relay server 700. When the moving image processing unit 670 carries out the moving image enhancement processing P2 on the moving image G, the frame division unit 672 firstly divides the compressed moving image data G into the I frames, the P frames and the B frames (Step S642). The decoding unit 674 decodes the I frames and the P frames, and obtains the decoded I frames I0 and the decoded P frames P0 (Step S644). The parameter calculation unit 678 in the correction unit 676 calculates the correction parameter f for the first decoded I frame I0 by using the data thereof (Steps S646 and S648). The correction execution unit 680 carries out the moving image enhancement processing P2 on all the decoded P frames sandwiched by the first decoded I frame I0 and the second decoded I frame I0 by using the correction parameter f (Step S650). The correction unit 676 performs the processing at Steps S648 and S650 for all the decoded I frames I0 and the decoded P frames P0 (Step S652: NO), and obtains the corrected decoded I frames I01 and the corrected decoded P frames P01 (Step S654). In other words, the parameter calculation unit 678 carries out the calculation processing for finding the correction parameter f for the decoded $i^{th}$ I frame I0 by using the data thereof (step S648), and the correction execution unit 680 carries out the correction execution processing on the decoded $i^{th}$ I frame I0 and on the decoded P frames P0 sandwiched by the decoded $i^{th}$ I frame I0 and the decoded $(i+1)^{th}$ I frame I0 with use of the correction parameter f (step S650). The calculation processing and the correction execution processing are repeated until all the decoded I frames and the decoded P frames are corrected (Step S652: NO). The encoding unit 682 encodes the corrected decoded I frames I01 and the corrected decoded P frames P01, and obtains the corrected I frames I02 and the corrected P frames P02 (Step S656). The combination unit 684 combines the corrected I frames I02 and the corrected P frames P02 with the B frames, and obtains the corrected moving image G' (Step S660). The corrected moving image G' is sent to the control unit 640.

As has been described above, according to the mobile phone system G in the seventh embodiment of the present invention, the moving image processing unit 670 in the relay server 700 firstly divides the moving image data G into the I frames, the P frames, and the B frames for carrying out the moving image enhancement processing P2 on the moving image data G. The decoding processing, the moving image enhancement processing, and the encoding processing are carried out only on the I frames and the P frames, and the corrected I frames I02 and the corrected P frames P02 are obtained. The corrected I frames I02 and the corrected P frames P02 are then combined with the B frames, and the processed moving image G' is obtained. At the time of carrying out the moving image enhancement processing, the correction parameter f is found for each of the decoded I frames I0 by using the data thereof, and the moving image enhancement processing is carried out on the corresponding decoded I frame I0 with use of the correction parameter f. For each of the decoded P frames P0, the correction parameter f is not found, and the correction parameter f for the decoded I frame I0 immediately preceding the corresponding P frame is used as the correction parameter for the moving image enhancement processing thereon. In this manner, an amount of data to be decoded and encoded can be reduced for shorter processing time. In addition, the correction parameter f can be prevented from changing substantially, which leads to prevention of fluctuating lightness at the time of display of the processed compressed moving image data G'.

Although the preferred embodiments of the image processing apparatus and the program of the present invention have been explained above, the present invention is not limited to the embodiments described above. Within the scope of the present invention, various modifications can be made thereto.

For example, in the mobile phone system C shown in FIG. 9, the moving image processing unit 270 of the relay server 300 divides the compressed moving image data G into the intra frames and the inter frames. The inter frames are further divided into the intra blocks and the inter blocks. The decoding processing and the image enhancement processing are carried out on the intra frames and on the intra blocks for improving image quality. However, the compressed moving image data may be divided only into the intra frames and the inter frames so that the decoding processing and the image enhancement processing can be carried out only on the intra frames.

Like the moving image processing unit 270, in the mobile phone system D shown in FIG. 13, the moving image processing unit 370 in the relay server 400 does not necessarily divide the B frames into the intra blocks and the inter blocks. In this case, the moving image processing unit 370 carries out the decoding processing and the image enhancement processing only on the I frames and the P frames.

In the moving image processing unit 570 of the relay server 600 in the mobile phone system F shown in FIG. 21, the parameter adjustment unit 580 adjusts the correction parameter f found for each of the decoded intra frames by using the average of the correction parameter f found for the corresponding decoded intra frame and for the two sandwiching decoded intra frames. The image enhancement processing is then carried out on the corresponding decoded intra frame by using the correction parameter f adjusted in the above manner. In this manner, lightness of the processed compressed moving image data can be prevented from changing substantially at the time of display of the data. However, upon photography of a moving image, a moving image may have a plurality of scenes such as an indoor scene changed from an outdoor scene in some cases. If the image enhancement processing described above is carried out on the moving image by using the correction parameter averaged for frames before and after a scene change, the scene change may become unclear. For such moving image data including a scene change, a boundary frame representing a scene change may be detected by using a scene detection technique. In this case, the correction parameter is adjusted by averaging the correction parameter for frames belonging to the same scene sandwiched by two neighboring boundary frames. In this manner, the scene change can be displayed clearly while lightness in the processed compressed moving image data can be prevented from changing substantially.

Although the image processing apparatus and the program of the present invention are applied to the mobile phone systems in the first to seventh embodiments, application of the present invention is not limited to the mobile phone systems. The image processing apparatus and the program of present invention can be applied to any system or apparatus such as a video phone and a moving image display device that obtains processed compressed moving image data by carrying out image enhancement processing on compressed moving image data.

What is claimed is:

1. An image processing apparatus for obtaining processed compressed moving image data by carrying out image enhancement processing on compressed moving image data, the image processing apparatus comprising:
    division means for dividing the compressed moving image data into a target part to be corrected and a non-target part not to be corrected;
    decoding means for obtaining decoded data by decoding the target part;
    correction means for obtaining corrected decoded data by carrying out the image enhancement processing on the decoded data;
    encoding means for encoding the corrected decoded data;
    combination means for obtaining the processed compressed moving image data by combining the target part that has been encoded with the non-target part;
    block division means for dividing the non-target part into intra blocks and inter blocks,
    the decoding means further obtaining decoded intra blocks by decoding the intra blocks,
    the correction means further obtaining corrected decoded intra blocks by carrying out the image enhancement processing on the decoded intra blocks,
    the encoding means further obtaining corrected intra blocks by encoding the corrected decoded intra blocks, and
    the combination means obtaining the processed compressed moving image data by combining the corrected decoded data and the corrected intra blocks with the inter blocks, and
    wherein the image enhancement processing comprises at least one of gradation correction, white balance correction, density correction, and sharpness processing.

2. An image processing apparatus for obtaining processed compressed moving image data by carrying out image enhancement processing on compressed moving image data obtained according to a compression method using a first frame as a reference frame, the image processing apparatus comprising:
    division means for dividing the compressed moving image data into the first frame and other frames;
    decoding means for obtaining a decoded first frame by decoding the first frame;
    correction means for obtaining a corrected decoded first frame by carrying out the image enhancement processing on the decoded first frame;
    encoding means for obtaining a corrected first frame by encoding the corrected decoded first frame;
    combination means for obtaining the processed compressed moving image data by combining the corrected first frame with the other frames; and
    block division means for dividing the other frames into intra blocks and inter blocks,
    the decoding means further obtaining decoded intra blocks by decoding the intra blocks,
    the correction means further obtaining corrected decoded intra blocks by carrying out the image enhancement processing on the decoded intra blocks,
    the encoding means further obtaining corrected intra blocks by encoding the corrected decoded intra blocks, and
    the combination means obtaining the processed compressed moving image data by combining the corrected decoded first frame and the corrected intra blocks with the inter blocks, and
    wherein the image enhancement processing comprises at least one of gradation correction, white balance correction, density correction, and sharpness processing.

3. An image processing apparatus for obtaining processed compressed moving image data by carrying out image enhancement processing on compressed moving image data comprising intra frames and inter frames, the image processing apparatus comprising:
    division means for dividing the compressed moving image data into the intra frames and the inter frames;
    decoding means for obtaining decoded intra frames by decoding the intra frames;
    correction means for obtaining corrected decoded intra frames by carrying out the image enhancement processing on the decoded intra frames;
    encoding means for obtaining corrected intra frames by encoding the corrected decoded intra frames; and;
    combination means for obtaining the processed compressed moving image data by combining the corrected intra frames with the inter frames;
    block division means for dividing the inter frames into intra blocks and inter blocks,
    the decoding means further obtaining decoded intra blocks by decoding the intra blocks,
    the correction means further obtaining corrected decoded intra blocks by carrying out the image enhancement processing on the decoded intra blocks,
    the encoding means further obtaining corrected intra blocks by encoding the corrected decoded intra blocks, and
    the combination means obtaining the processed compressed moving image data by combining the corrected intra frames and the corrected intra blocks with the inter blocks,
    wherein the image enhancement processing comprises at least one of gradation correction, white balance correction, density correction, and sharpness processing.

4. An image processing apparatus for obtaining processed compressed moving image data by carrying out image enhancement processing on compressed moving image data comprising I frames, P frames, and B frames, the image processing apparatus comprising:
    division means for dividing the compressed moving image data into the I frames, the P frames and the B frames;
    decoding means for obtaining decoded I frames and decoded P frames by decoding the I frames and the P frames;
    correction means for obtaining corrected decoded I frames and corrected decoded P frames by carrying out the image enhancement processing on the decoded I frames and on the decoded P frames;
    encoding means for obtaining corrected I frames and corrected P frames by encoding the corrected decoded I frames and the corrected decoded P frames;
    combination means for obtaining the processed compressed moving image data by combining the corrected I frames and the corrected P frames with the B frames; and
    block division means for dividing the B frames into intra blocks and inter blocks,
    the decoding means further obtaining decoded intra blocks by decoding the intra blocks, the correction means further obtaining corrected decoded intra blocks by carrying out the image enhancement processing on the decoded intra blocks, the encoding means further obtaining corrected intra blocks by encoding the corrected decoded intra blocks, and the combination means obtaining the processed compressed moving image data by combining the corrected I frames, the corrected P frames, and the corrected intra blocks with the inter blocks, wherein the image enhancement processing comprises at least one of gradation correction, white balance correction, density correction, and sharpness processing.

5. An image processing apparatus for obtaining processed compressed moving image data by carrying out image enhancement processing on compressed moving image data mainly comprising discrete cosine transform (DCT) coefficient data and motion vector data of each frame, the image processing apparatus comprising:

extraction means for extracting the DCT coefficient data and the motion vector data from the compressed moving image data;

decoding means for obtaining decoded data by decoding the compressed moving image data with use of the DCT coefficient data and the motion vector data;

correction means for obtaining corrected decoded data by carrying out the image enhancement processing on the decoded data; and encoding means for obtaining the processed compressed moving image data by encoding the corrected decoded data, wherein the encoding means encodes the corrected decoded data by using the motion vector data obtained by the extraction means, wherein the image enhancement processing comprises at least one of gradation correction, white balance correction, density correction, and sharpness processing, wherein the compressed moving image data comprises intra frames and inter frames, and wherein in said image processing:

block division means divides the inter frames into intra blocks and inter blocks;

decoding means obtains decoded intra blocks by decoding the intra blocks;

correction means obtains corrected decoded intra blocks by carrying out the image enhancement processing on the decoded intra blocks;

encoding means obtains corrected intra blocks by encoding the corrected decoded intra blocks; and combination means obtains the processed compressed moving image data by combining the corrected decoded data and the corrected intra blocks with the inter blocks.

6. An image processing apparatus for obtaining processed compressed moving image data by carrying out image enhancement processing on compressed moving image data comprising a plurality of frames, the image processing apparatus comprising:

division means for dividing the compressed moving image data into target frames and non-target frames;

decoding means for obtaining decoded frames by decoding the target frames;

correction means for obtaining corrected decoded frames by carrying out the image enhancement processing on the decoded frames;

encoding means for obtaining corrected frames by encoding the corrected decoded frames; and combination means for obtaining the processed compressed moving image data by combining the corrected frames with the non-target frames, wherein the correction means comprises:

correction parameter calculation means for calculating a correction parameter for each of the decoded frames by using data of a corresponding decoded frame;

parameter adjustment means for obtaining an adjusted parameter for each of the decoded frames by adjusting the correction parameter thereof, with use of the correction parameter for the decoded frame or frames that at least one of precedes and follows the decoded frame corresponding to the correction parameter that is going to be adjusted; and correction execution means for carrying out the image enhancement processing on each of the decoded frames by using the adjusted parameter, wherein the image enhancement processing comprises at least one of gradation correction, white balance correction, density correction, and sharpness processing, and wherein the parameter adjustment means sets the adjusted parameter for each of the decoded frames as an average of the correction parameter thereof and the correction parameter of at least one of the decoded frames that at least one of precedes and follows the corresponding decoded frame.

7. An image processing apparatus for obtaining processed compressed moving image data by carrying out image enhancement processing on compressed moving image data comprising an intra frame and inter frames, the image processing apparatus comprising:

division means for dividing the compressed moving image data into the intra frame, target inter frames and non-target inter frames;

decoding means for obtaining decoded frames comprising a decoded intra frame and decoded target inter frames by decoding the intra frame and the target inter frames;

correction means for obtaining corrected decoded frames by carrying out the image enhancement processing on the decoded frames;

encoding means for obtaining corrected frames by encoding the corrected decoded frames;

combination means for obtaining the processed compressed moving image data by combining the corrected frames with the non-target inter frames; and block division means for dividing the inter frames into intra blocks and inter blocks, the decoding means further obtaining decoded intra blocks by decoding the intra blocks, the correction means further obtaining corrected decoded intra blocks by carrying out the image enhancement processing on the decoded intra blocks, the encoding means further obtaining corrected intra blocks by encoding the corrected decoded intra blocks, and the combination means obtaining the processed compressed moving image data by combining the corrected decoded frames and the corrected intra blocks with the inter blocks, wherein the correction means carries out the image enhancement processing on the decoded intra frame by calculating a correction parameter therefor and on the decoded target inter frames by using the correction parameter of the decoded intra frame that immediately precedes the decoded target inter frames, and wherein the image enhancement processing comprises at least one of gradation correction, white balance correction, density correction, and sharpness processing.

8. A machine-readable storage medium encoded with a computer program causing a computer to carry out image processing for obtaining processed compressed moving image data through image enhancement processing on compressed moving image data, the image processing comprising:

dividing the compressed moving image data into a target part to be corrected and a non-target part not to be corrected;

decoding the target part for obtaining decoded data;

carrying out the image enhancement processing on the decoded data for obtaining corrected decoded data;

encoding the corrected decoded data; and combining the target part that has been encoded with the non-target part for obtaining the processed compressed moving image data, wherein the image enhancement processing comprises at least one of gradation correction, white balance correction, density correction, and sharpness processing, and wherein in said image processing:

block division means divides the non-target part into intra blocks and inter blocks;

decoding means obtains decoded intra blocks by decoding the intra blocks;

correction means obtains corrected decoded intra blocks by carrying out the image enhancement processing on the decoded intra blocks;

encoding means obtains corrected intra blocks by encoding the corrected decoded intra blocks; and combination means obtains the processed compressed moving image data by combining the corrected decoded data and the corrected intra blocks with the inter blocks.

9. A machine-readable storage medium encoded with a computer program causing a computer to carry out image processing for obtaining processed compressed moving image data through image enhancement processing on compressed moving image data obtained according to a compression method using a first frame as a reference frame, the image processing comprising:

dividing the compressed moving image data into the first frame and other frames;

decoding the first frame for obtaining a decoded first frame;

carrying out the image enhancement processing on the decoded first frame for obtaining a corrected decoded first frame;

encoding the corrected decoded first frame for obtaining a corrected first frame;

combining the corrected first frame with the other frames for obtaining the processed compressed moving image data, wherein the image enhancement processing comprises at least one of gradation correction, white balance correction, density correction, and sharpness processing, and wherein in said image processing:

block division means divides the other frames into intra blocks and inter blocks;

decoding means obtains decoded intra blocks by decoding the intra blocks;

correction means obtains corrected decoded intra blocks by carrying out the image enhancement processing on the decoded intra blocks;

encoding means obtains corrected intra blocks by encoding the corrected decoded intra blocks; and combination means obtains the processed compressed moving image data by combining the corrected first frame and the corrected intra blocks with the inter blocks.

10. A machine-readable storage medium encoded with a computer program causing a computer to carry out image processing for obtaining processed compressed moving image data through image enhancement processing on compressed moving image data comprising intra frames and inter frames, the image processing comprising:

dividing the compressed moving image data into the intra frames and the inter frames;

decoding the intra frames for obtaining decoded intra frames;

carrying out the image enhancement processing on the decoded intra frames for obtaining corrected decoded intra frames;

encoding the corrected decoded intra frames for obtaining corrected intra frames; and combining the corrected intra frames with the inter frames for obtaining the processed compressed moving image data, wherein the image enhancement processing comprises at least one of gradation correction, white balance correction, density correction, and sharpness processing, dividing further comprising dividing the inter frames into intra blocks and inter blocks, decoding being decoding the intra frames and the intra blocks for obtaining the decoded intra frames and decoded intra blocks, carrying out the image enhancement processing being carrying out the image enhancement processing on the decoded intra frames and on the decoded intra blocks for obtaining the corrected decoded intra frames and corrected decoded intra blocks, encoding being encoding the corrected decoded intra frames and the corrected decoded intra blocks for obtaining the corrected intra frames and corrected intra blocks, and combining being combining the corrected intra frames and the corrected intra blocks with the inter blocks for obtaining the processed compressed moving image data.

11. A machine-readable storage medium encoded with a computer program causing a computer to carry out image processing for obtaining processed compressed moving image data through image enhancement processing on compressed moving image data comprising I frames, P frames, and B frames, the image processing comprising:

dividing the compressed moving image data into the I frames, the P frames and the B frames;

decoding the I frames and the P frames for obtaining decoded I frames and decoded P frames;

carrying out the image enhancement processing on the decoded I frames and on the decoded P frames for obtaining corrected decoded I frames and corrected decoded P frames;

encoding the corrected decoded I frames and the corrected decoded P frames for obtaining corrected I frames and corrected P frames; and combining the corrected I frames and the corrected P frames with the B frames for obtaining the processed compressed moving image data, wherein the image enhancement processing comprises at least one of gradation correction, white balance correction, density correction, and sharpness processing, dividing further comprising dividing the B frames into intra blocks and inter blocks, decoding being decoding the I frames, the P frames, and the intra blocks for obtaining the decoded I frames, the decoded P frames and decoded intra blocks, carrying out the image enhancement processing being carrying out the image enhancement processing on the decoded I frames, the decoded P frames and the decoded intra blocks for obtaining the corrected decoded I frames, the corrected decoded P frames, and corrected decoded intra blocks, encoding being encoding the corrected decoded I frames, the corrected decoded P frames and the corrected decoded intra blocks for obtaining the corrected I frames, the corrected P frames and corrected intra blocks, and combining being combining the corrected I frames, the corrected P frames, and the corrected intra blocks with the inter blocks for obtaining the processed compressed moving image data.

12. A machine-readable storage medium encoded with a computer program causing a computer to carry out image processing for obtaining processed compressed moving image data through image enhancement processing on compressed moving image data mainly comprising discrete cosine transform (DCT) coefficient data and motion vector data of each frame, the image processing comprising:

extracting the DCT coefficient data and the motion vector data from the compressed moving image data;

decoding the compressed moving image data with use of the DCT coefficient data and the motion vector data for obtaining decoded data;

carrying out the image enhancement processing on the decoded data for obtaining corrected decoded data; and encoding the corrected decoded data for obtaining the processed compressed moving image data, wherein encoding being encoding the corrected decoded data by using the motion vector data obtained at extracting, wherein the image enhancement processing comprises at least one of gradation correction, white balance correction, density correction, and sharpness processing, wherein the compressed moving image data comprises intra frames and inter frames, and wherein in said image processing:

block division means divides the inter frames into intra blocks and inter blocks;

decoding means obtains decoded intra blocks by decoding the intra blocks;

correction means obtains corrected decoded intra blocks by carrying out the image enhancement processing on the decoded intra blocks;

encoding means obtains corrected intra blocks by encoding the corrected decoded intra blocks; and combination means obtains the processed compressed moving image data by combining the corrected decoded data and the corrected intra blocks with the inter blocks.

13. A machine-readable storage medium encoded with a computer program causing a computer to carry out image processing for obtaining processed compressed moving image data through image enhancement processing on compressed moving image data comprising a plurality of frames, the image processing comprising:

dividing the compressed moving image data into target frames and non-target frames;

decoding the target frames for obtaining decoded frames;

carrying out the image enhancement processing on the decoded frames for obtaining corrected decoded frames;

encoding the corrected decoded frames for obtaining corrected frames; and combining the corrected frames with the non-target frames for obtaining the processed compressed moving image data, wherein carrying out the image enhancement processing further comprises:

calculating a correction parameter for each of the decoded frames by using data of a corresponding decoded frame;

obtaining an adjusted parameter for each of the decoded frames by adjusting the correction parameter thereof with use of the correction parameter for the decoded frame or frames that at least one of precedes and follows the decoded frame corresponding to the correction parameter that is going to be adjusted; and carrying out the image enhancement processing on each of the decoded frames by using the adjusted parameter, wherein the image enhancement processing comprises at least one of gradation correction, white balance correction, density correction, and sharpness processing, and wherein in said image processing:

block division means divides the non-target frames into intra blocks and inter blocks;

decoding means obtains decoded intra blocks by decoding the intra blocks;

correction means obtains corrected decoded intra blocks by carrying out the image enhancement processing on the decoded intra blocks;

encoding means obtains corrected intra blocks by encoding the corrected decoded intra blocks; and combination means obtains the processed compressed moving image data by combining the corrected decoded frames and the corrected intra blocks with the inter blocks.

14. A machine-readable storage medium encoded with a computer program causing a computer to carry out image processing for obtaining processed compressed moving image data through image enhancement processing on compressed moving image data comprising an intra frame and inter frames, the image processing comprising:

dividing the compressed moving image data into the intra frame, target inter frames and non-target inter frames;

decoding the intra frame and the target inter frames for obtaining decoded frames comprising a decoded intra frame and decoded target inter frames;

carrying out the image enhancement processing on the decoded frames for obtaining corrected decoded frames;

encoding the corrected decoded frames for obtaining corrected frames;

combining the corrected frames with the non-target inter frames for obtaining the processed compressed moving image data, and block division means for dividing the non-target inter frames into intra blocks and inter blocks, the decoding means further obtaining decoded intra blocks by decoding the intra blocks, the correction means further obtaining corrected decoded intra blocks by carrying out the image enhancement processing on the decoded intra blocks, the encoding means further obtaining corrected intra blocks by encoding the corrected decoded intra blocks, and the combination means obtaining the processed compressed moving image data by combining the corrected decoded frames and the corrected intra blocks with the inter blocks, wherein carrying out the image enhancement processing is carrying out the image enhancement processing on the decoded intra frame by calculating a correction parameter therefor and on the decoded target inter frames by using the correction parameter of the decoded intra frame that immediately precedes the decoded target inter frames and wherein the image enhancement processing comprises at least one of gradation correction, white balance correction, density correction, and sharpness processing.

* * * * *